(12) United States Patent
Fierro, II

(10) Patent No.: US 11,234,546 B2
(45) Date of Patent: Feb. 1, 2022

(54) DISPLAY MOUNT

(71) Applicant: Engrave My Achievement, Wilmington, DE (US)

(72) Inventor: Ronald A. Fierro, II, New Castle, DE (US)

(73) Assignee: ENGRAVE MY ACHIEVEMENT, Wilmington, DE (US)

( * ) Notice: Subject to any disclaimer, the term of this patent is extended or adjusted under 35 U.S.C. 154(b) by 29 days.

(21) Appl. No.: 16/856,636

(22) Filed: Apr. 23, 2020

(65) Prior Publication Data

US 2020/0337487 A1 Oct. 29, 2020

Related U.S. Application Data

(60) Provisional application No. 62/837,234, filed on Apr. 23, 2019.

(51) Int. Cl.
| | |
|---|---|
| *A47F 5/10* | (2006.01) |
| *A47G 25/10* | (2006.01) |
| *F16M 11/24* | (2006.01) |
| *A47F 7/06* | (2006.01) |
| *F16B 5/00* | (2006.01) |
| *F16M 11/22* | (2006.01) |
| *A47F 5/16* | (2006.01) |

(52) U.S. Cl.
CPC ............... *A47G 25/10* (2013.01); *A47F 5/10* (2013.01); *A47F 7/06* (2013.01); *F16B 5/0084* (2013.01); *F16M 11/22* (2013.01); *F16M 11/24* (2013.01); *A47F 2005/165* (2013.01)

(58) Field of Classification Search
CPC . A47B 23/044; A47F 7/06; A47F 5/10; A47F 2005/165; A47F 7/0042; A47F 7/0057; A47F 7/0064; A47F 7/14; A47F 7/142; F16B 5/0084; F16M 11/22; G09F 1/14

USPC .................................................... 248/460
See application file for complete search history.

(56) References Cited

U.S. PATENT DOCUMENTS 1,047,882 A * 12/1912 Beach ...................... A47B 3/12
108/101
2,421,232 A * 5/1947 Applegate ............ A47G 1/1646
248/166

(Continued)

OTHER PUBLICATIONS

Retail Resource, 4"H Black Wooden Plate Stand accessed on Aug. 19, 2020; URL <https://www.retailresource.com/product/46398/4H-Black-WoodenPlateStand_aiid=13594&teng=gp&beng=g&deng=c&peng=&ieng=92705205481&kieng=pla-313150004578&cieng=410992360046&cpieng=8843715003&feng=&cleng=CjwKCAjwssDOBRBlEiwA-JP5rBcQ7k16qzRyJcGh_bbphKaEt83yHhaMLVSGLRaJ6Ca4tnbgily0KRoCj6gQAvD_BwE&utm_source=google&utm_medium=pla&utm_campaign=retailresourcesmartshoppingbs> 3 pages.

(Continued)

*Primary Examiner* — Bradley Duckworth
(74) *Attorney, Agent, or Firm* — Morgan, Lewis & Bockius LLP

(57) ABSTRACT

A display mount including a stand having a first stand leg and a second stand leg, the first stand leg interlocked with the second stand leg forming a joint and a stabilizer releasably coupled to the stand and having a slot, the first stand leg and the second stand leg each extending through the slot fixing the joint in place. The display mount further includes a display releasably coupled to the stand and having a front surface and a rear surface, the rear surface having a recess. A top end of the stand extends into the recess to hold the display in place.

15 Claims, 25 Drawing Sheets

(56) References Cited

U.S. PATENT DOCUMENTS

| | | | | |
|---|---|---|---|---|
| 2,456,964 | A * | 12/1948 | Ledure | A47F 7/06 211/33 |
| 2,480,731 | A * | 8/1949 | Haughwout | A45C 11/02 211/33 |
| 2,648,931 | A * | 8/1953 | Deveau | A47B 23/042 248/460 |
| 3,282,437 | A * | 11/1966 | Henry | A47F 7/0064 211/41.7 |
| 3,593,955 | A * | 7/1971 | Hind | A47B 23/042 248/448 |
| 4,171,790 | A * | 10/1979 | Crescenti | A47G 7/041 248/27.8 |
| 4,205,818 | A * | 6/1980 | Lawler | A47B 19/002 211/85.6 |
| 5,303,829 | A * | 4/1994 | Kennedy | A47F 7/06 211/30 |
| 5,472,098 | A * | 12/1995 | Ho | A47B 23/042 211/189 |
| 5,974,707 | A * | 11/1999 | Kowalczyk | G09F 7/18 211/189 |
| 6,338,216 | B1 * | 1/2002 | Young | A47B 97/08 248/444.1 |
| 6,352,233 | B1 * | 3/2002 | Barberich | A47B 21/0314 248/456 |
| 6,682,041 | B1 * | 1/2004 | Branham, II | A47F 5/10 248/441.1 |
| 6,835,883 | B2 * | 12/2004 | Stevens | F16M 11/22 84/327 |
| 6,898,863 | B2 | 5/2005 | Allen | |
| 8,398,048 | B2 | 3/2013 | Popkin et al. | |
| 8,424,831 | B2 * | 4/2013 | Lin | A47B 23/044 248/460 |
| 9,022,341 | B2 * | 5/2015 | Radmard | F16M 13/00 248/558 |
| 9,241,526 | B2 * | 1/2016 | Goldberg | A42B 1/248 |
| 9,357,861 | B2 * | 6/2016 | Waksul | A47J 47/16 |
| 9,433,287 | B2 * | 9/2016 | Chen | A47B 81/06 |
| 9,839,304 | B2 * | 12/2017 | Liao | A47F 5/10 |
| 9,885,443 | B2 * | 2/2018 | Max | A47B 23/044 |
| 10,226,140 | B2 * | 3/2019 | Waksul | A47B 81/04 |
| 10,750,884 | B2 * | 8/2020 | Hansen | A63C 17/0006 |
| 2005/0121567 | A1 * | 6/2005 | Meuniot | F16M 11/38 248/150 |
| 2008/0041797 | A1 * | 2/2008 | Feldges | A47F 3/142 211/37 |
| 2009/0179124 | A1 * | 7/2009 | Caplan | F16M 11/22 248/176.1 |
| 2009/0321605 | A1 * | 12/2009 | Petrie | F16M 13/00 248/452 |
| 2011/0215218 | A1 * | 9/2011 | Jarrett | F16M 11/22 248/440.1 |
| 2020/0333839 | A1 * | 10/2020 | Vidyasagaran | A47B 23/044 |

OTHER PUBLICATIONS

Inhabitat, New Rado's Flat-Pack Intesion Stools Surprise With Bold Pops of Color, May 3, 2012, accessed Aug. 19, 2020 via Internet URL <https://inhabitat.com/new-rados-flat-pack-intension-furnishings-surprise-with-bold-pops-of-color/> 2 pages.

Maslow Community Garden, Flat Pack Bar Stool, accessed Oct. 5, 2020 via the Internet URL <maslowcommunitygarden.org/Flat-Pack-Bar-Stool.html> 1 page.

\* cited by examiner

DISPLAY MOUNT

CROSS-REFERENCE TO RELATED APPLICATIONS

This application claims the benefit of U.S. Provisional Patent Application No. 62/837,234 filed Apr. 23, 2019 entitled "Display Mount", which is incorporated by reference herein in its entirety.

FIELD OF THE INVENTION

The present invention generally relates to a display mount and/or stand for displaying a decorative object on a horizontal and/or vertical surface.

BACKGROUND OF THE INVENTION

Display mounts for celebrating many achievements throughout life have been widely used and are commonplace. Display mounts can be used to display graduations, milestone moments, new additions to the family, or any other important achievement. There are a variety of display mounts that allow for displaying of achievements on horizontal and/or vertical surfaces. For displaying on a horizontal surface, these display mounts require a stand component, which acts to support a display portion displaying the achievement.

Currently, display mounts require inserting a photo or certificate into the display portion of the display mount. These display mounts may be bulky and require significant assembly by the user. Further, these display mounts may require significant manufacturing and may generate significant waste during cutting and manufacturing of the stand components.

Accordingly, there is a need to create a display mount that is easy to assembly and manufactured without generating significant waste.

BRIEF SUMMARY OF THE INVENTION

In one embodiment, there is a display mount including a stand having a first stand leg and a second stand leg, the first stand leg interlocked with the second stand leg forming a joint and a stabilizer releasably coupled to the stand and having a slot, the first stand leg and the second stand leg each extending through the slot fixing the joint in place. The display mount further including a display releasably coupled to the stand and having a front surface and a rear surface, the rear surface having a recess. A top end of the stand extends into the recess to hold the display in place.

In one embodiment, at least one of the first stand leg and the second stand leg includes an aperture located between the stabilizer and the display. The display mount further includes a locking member overlapping with the stabilizer and extending into the aperture to prevent the stabilizer from being removed from the stand.

In one embodiment, the slot of the stabilizer is sized and shaped to receive the locking member when the stabilizer is removed from the stand.

In one embodiment, the first stand leg, the second stand leg, the stabilizer and the display are cut from a single sheet of material. Multiples copies of the first stand leg, the second stand leg, and the stabilizer may be sized and shaped to comprise greater than 80% of the single sheet of material.

In one embodiment, the first stand leg and the second stand leg each include a butterfly tab having a supporting surface and the recess of the display receives each butterfly tab such that the butterfly tab is disposed within the recess and each supporting surface abuts the rear surface of the display. One of the first stand leg or the second stand leg may include a notch extending from a bottom edge of the first stand leg or the second stand leg, the notch being sized and shaped to match a contour of the butterfly tab of the first stand leg and the second stand leg when the stand is disassembled.

In one embodiment, the first stand leg and the second stand leg each include a stabilizing wedge having a flat portion co-planar with and abutting the rear surface of the display when the display is coupled to the stand. The stabilizer may be perpendicular to each of the first stand leg and the second stand leg when the first stand leg and the second stand leg are disposed within the slot of the stabilizer.

In one embodiment, the stabilizer is a first stabilizer and the display mount further includes a second stabilizer sized and shaped to fit within a cutout of the first stabilizer when the first stabilizer is removed from the stand. The second stabilizer may have a slot, wherein the first stand leg and the second stand leg each extend through the slot of the second stabilizer.

In one embodiment, the recess of the display includes a top edge and two side walls, the two side walls disposed on opposite sides of the recess and angled outward away from the top edge.

In one embodiment, the slot of the stabilizer includes a first segment and second segment, the first segment being at substantially a 90° angle relative to the second segment.

In one embodiment, the display includes a protrusion disposed on the rear surface of the display, the recess extending through the protrusion and closed off by the rear surface of the display.

In one embodiment, the first stand leg includes a plurality of tabs and the second stand leg includes a plurality of recesses, wherein the plurality of tabs of the first stand leg interlock with the plurality of recesses of the second stand leg to couple the first stand leg to the second stand leg to form the joint.

In one embodiment, the display includes a mortarboard shape, a protrusion extending from the rear surface of the display, an engraved picture on the front surface of the display and a tassel coupled to the protrusion of the display via a tassel holder to allow the tassel to overhang on the front surface of the display.

Another embodiment of the present invention provides for a decorative graduation cap display including a stand having a bottom edge, a first stand leg and a second stand leg, the first stand leg and the second stand leg each including a plurality of tabs, the plurality of tabs of the first stand leg interlocking with the plurality of tabs of the second stand leg at a substantially 90 degree angle forming a joint, wherein the first stand leg and the second stand leg each include a butterfly tab and a stabilizing wedge. The decorative graduation cap display further includes a stabilizer coupled to the stand and including a slot, the slot having a first segment and a second segment at a substantially 90 degree angle to the first segment, the first stand leg and the second stand leg each extending through the slot to fix the joint in place, wherein the stabilizer is disposed between the butterfly tabs and the bottom edge and perpendicular to each of the first stand leg and the second stand leg, a locking member having a first segment and a second segment, and an aperture disposed on one of the first stand leg or the second stand leg, the aperture located between the stabilizer and the display, the locking member extending through the aperture. The decorative graduation cap display also includes a display releasably coupled to the stand and having a front surface with an engraved image and/or message and a rear surface, the rear surface having an almond shaped protrusion to resemble a cap of a graduation cap, the protrusion having a recess sized and shaped to receive each of the butterfly tabs of the first stand leg and second stand leg, the front surface being square shaped to resemble a mortarboard of a graduation cap and a tassel coupled to the rear surface of the display and moveable relative to the display to overhang on either side of the front surface of the display.

Another embodiment of the present invention provides for a method including cutting from a single sheet of material a first stand leg, a second stand leg, a stabilizer, and a locking member, wherein multiple copies of the first stand leg, the second stand leg, the stabilizer, and the locking member are sized and shaped to comprise greater than 80% of the single sheet of material, and removing the first stand leg, the second stand leg, the stabilizer, and the locking member from the single sheet of material. The method further includes coupling the first stand leg to the second stand leg to form a joint such that the first stand leg is at a substantially 90 degree angle to the second stand leg when the stand is placed on a horizontal surface, coupling the stabilizer to the first stand leg and the second stand leg by sliding the stabilizer over the first stand leg and the second stand leg such that the first stand leg and the second stand leg extend through a slot disposed within the stabilizer to fix the joint in place, inserting the locking member through an aperture extending through one of the first stand leg and the second stand leg to prevent the stabilizer from being removed from the stand, and removeably coupling a display to both of the first stand leg and the second stand leg, the display having a recess, wherein the first stand leg and the second stand leg are inserted into the recess.

In one embodiment, the method further includes removing the display from the stand and mounting the display on a vertical surface via a fastener, wherein the recess receives the fastener.

BRIEF DESCRIPTION OF THE SEVERAL VIEWS OF THE DRAWINGS

The foregoing summary, as well as the following detailed description of embodiments of the display mount, will be better understood when read in conjunction with the appended drawings of exemplary embodiments. It should be understood, however, that the invention is not limited to the precise arrangements and instrumentalities shown.

DETAILED DESCRIPTION OF THE EXEMPLARY EMBODIMENTS OF THE INVENTION

Figure 1A:
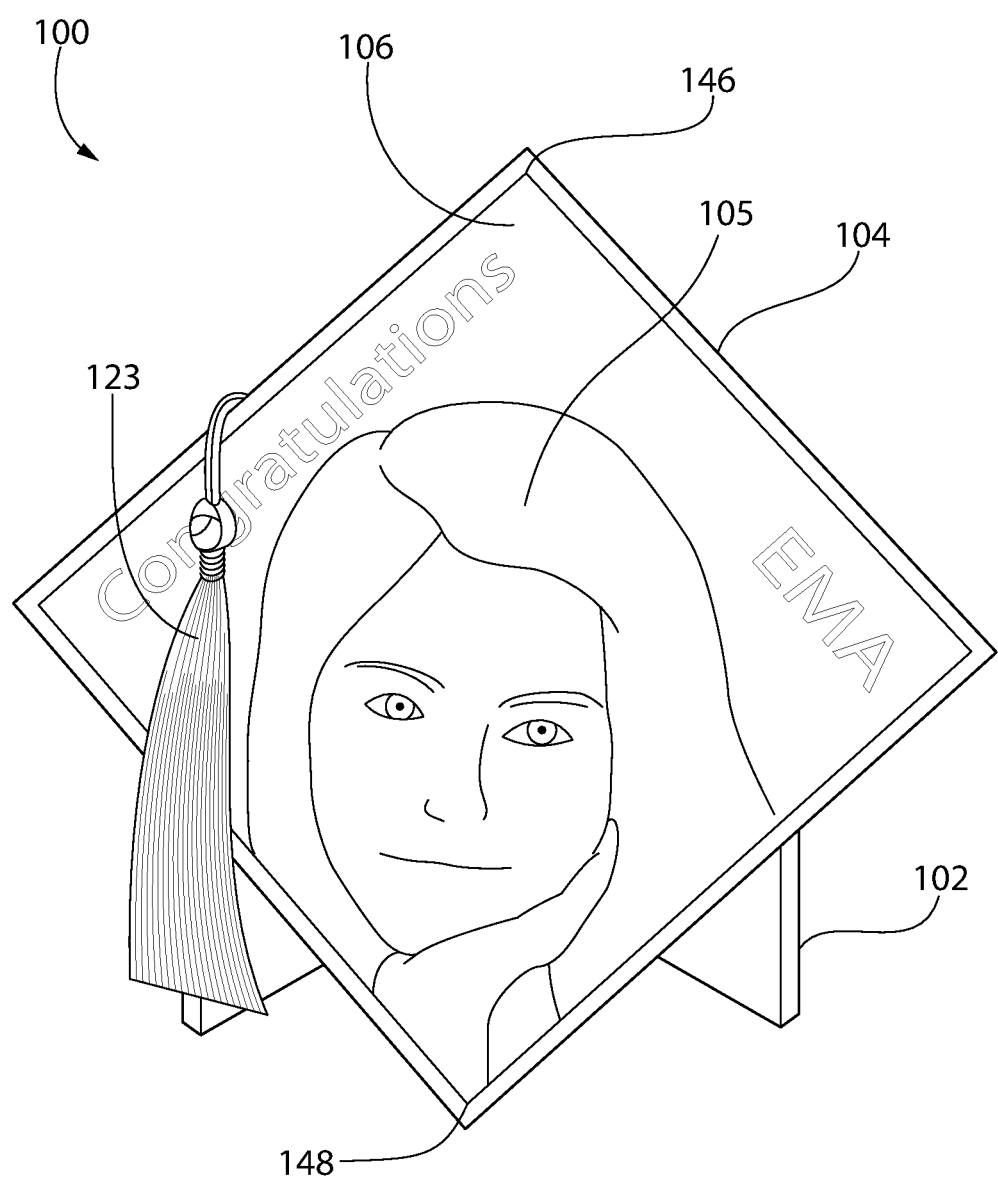
FIG. 1A is a front perspective view of a display mount in accordance with a first exemplary embodiment of the present invention.

Referring to the drawings in detail, wherein like reference numerals indicate like elements throughout, there is shown in FIGS. 1A-24C display mounts in accordance with exemplary embodiments of the present invention. The display mount, or decorative display mounting system, may include a mounting stand for supporting a display and may be easy to assembly. The display may include a photo, plaque, certificate, diploma, graduation cap, artwork, and/or any other decorative object or information that a user desires to display. The display mount may consist of multiple pieces which are combined to form the display mount. The multiple pieces of display mount may be shaped to allow multiple display mounts to be cut from a single sheet of material, thereby minimizing waste. The display mount may include a stand and a display, and allow for the display to be supported by a stand to showcase the display on a horizontal surface and/or to hang on a vertical surface. For example, the stand may be used to showcase the display initially, such as on a table at a graduation party, and then the display may later be hung on a wall, such as in an office.

Referring to FIGS. 1A-9, an exemplary display mount 100 is shown. Display mount 100 may include display 104 and stand 102. Stand 102 may be configured to support display 104 on horizontal surface 160. In one embodiment, stand 102 is configured to support display 104 at angle α relative to horizontal surface 160 on which display mount 100 is placed upon. Display 104 may include top 146 and bottom 148 and display 104 may be angled towards a viewer such that display 104 is at angle α relative to horizontal surface 160. Display 104 may be angled such that top 146 of display 104 is angled away from the viewer and bottom 148 is closer to the user. For example, angle α of display 104 relative to horizontal surface 160 may be between approximately 110 degrees and approximately 140 degrees relative to the horizontal surface. However, display 104 may be angled at between approximately 90 degrees and 180 degrees, approximately 105 degrees and approximately 165 degrees, or approximately 120 degrees and approximately 150 degrees. Display 104 may include front surface 106 and rear surface 108. Display 104 may be coupled to stand 102. In one embodiment, display 104 is removeably coupled to stand 102. Stand 102 may include first stand leg 110, second stand leg 112, stabilizer 114, and locking member 116. Rear surface 108 of display 104 may include protrusion 120 having recess 122. Front surface 106 of display 104 may include design 105 displayed onto front surface 106. In one embodiment, display 104 and stand 102 are comprised of wood and design 105 is etched onto front surface 106. In some embodiments, stand 102 is comprised of 100% wood. In some embodiments, the entirety of display mount 100 except for tassel 123 and tassel holder 153 are comprised of 100% wood. In one embodiment, design 105 is etched into the front surface using a laser engraver. However, design 105 may be etched or formed into front surface 106 via other methods such as a rotary saw, hand carving, layering, printing, painting, or any other method desired. In another embodiment, display 104 and stand 102 are comprised of acrylic and are cut using a laser cutter.

Figure 2:
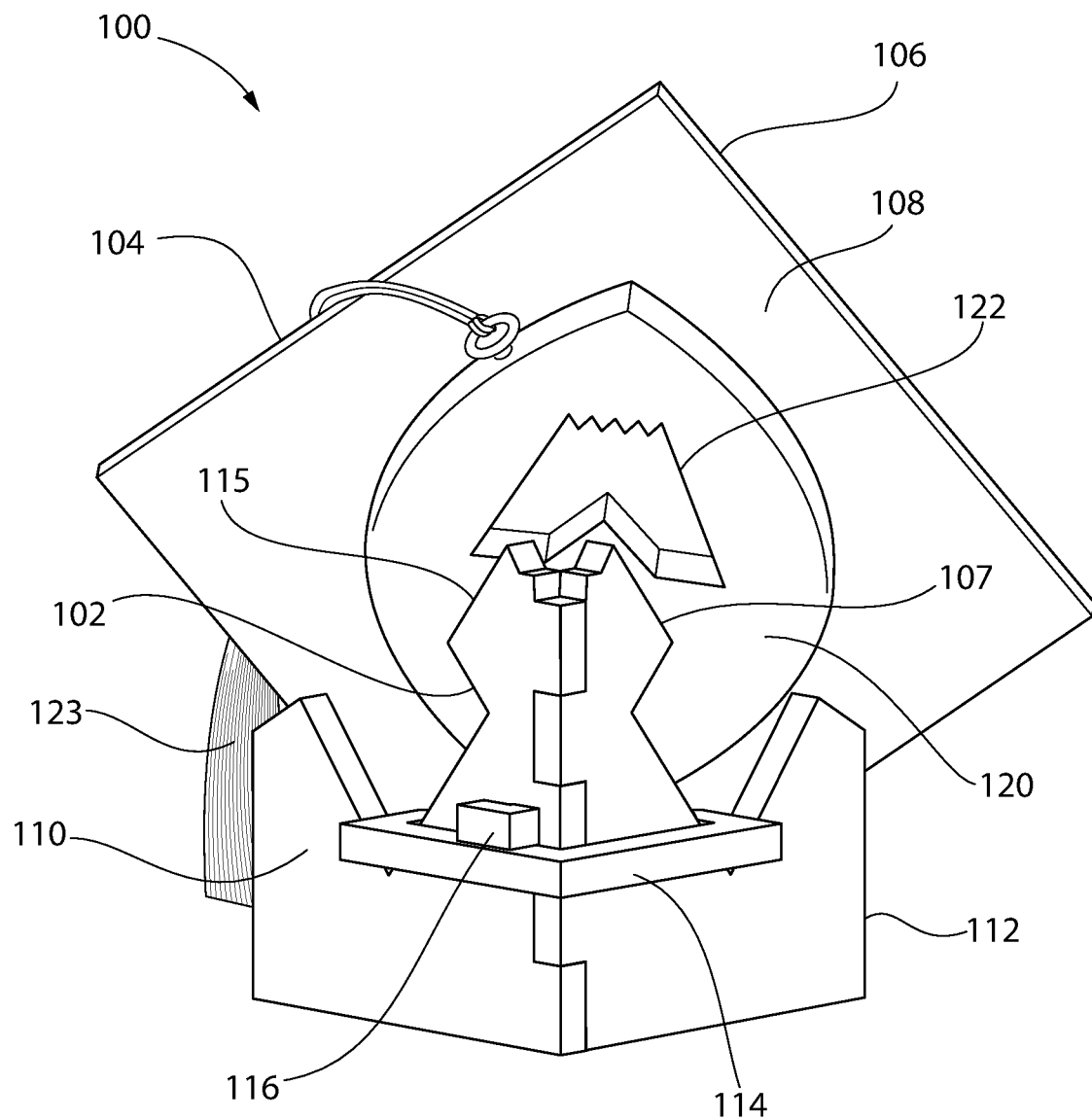
FIG. 2 is a rear perspective view of the display mount of FIG. 1A.
Figure 3:
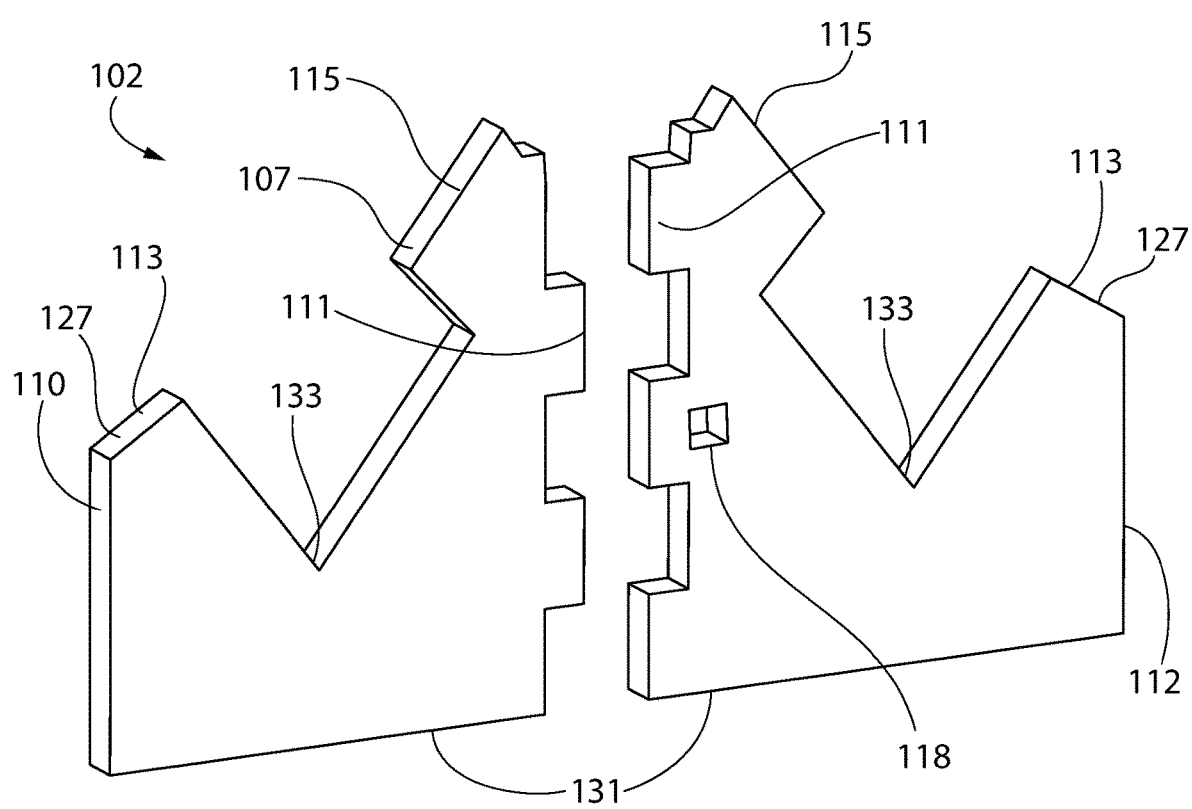
FIG. 3 is a front view of the stand of the display mount of FIG. 1A.
Figure 4:
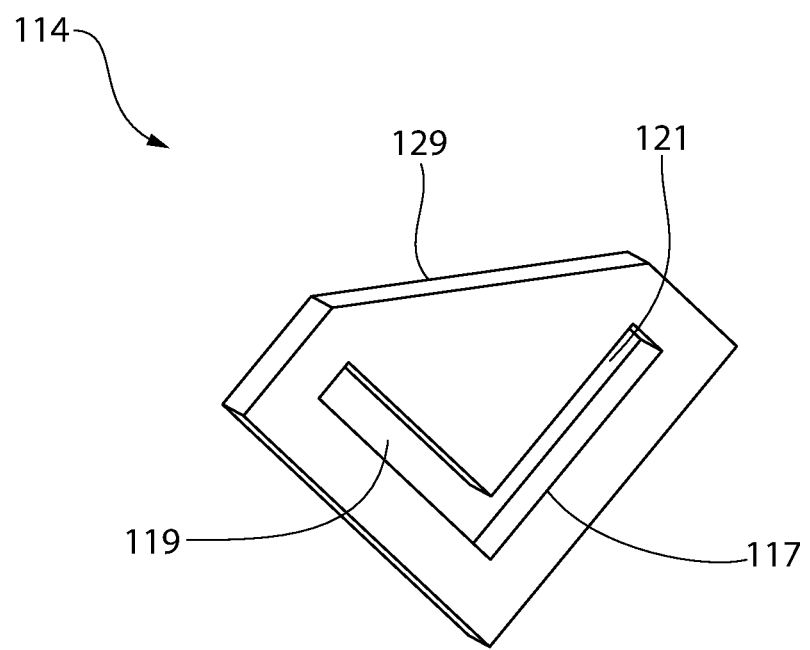
FIG. 4 is a top view of the stabilizer of the display mount of FIG. 1A.
Figure 5:
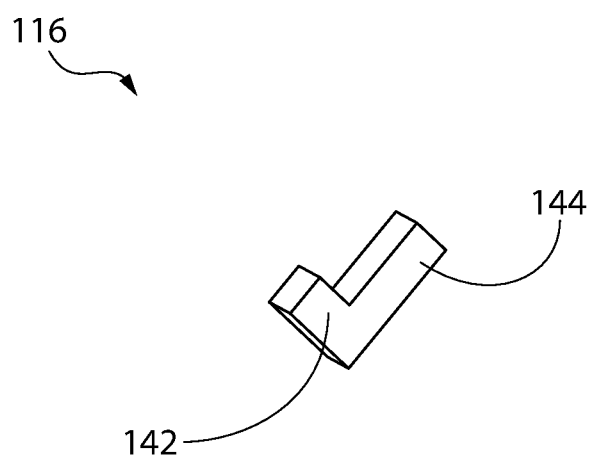
FIG. 5 is a top view of the locking member of the display mount of FIG. 1A.
Figure 6:
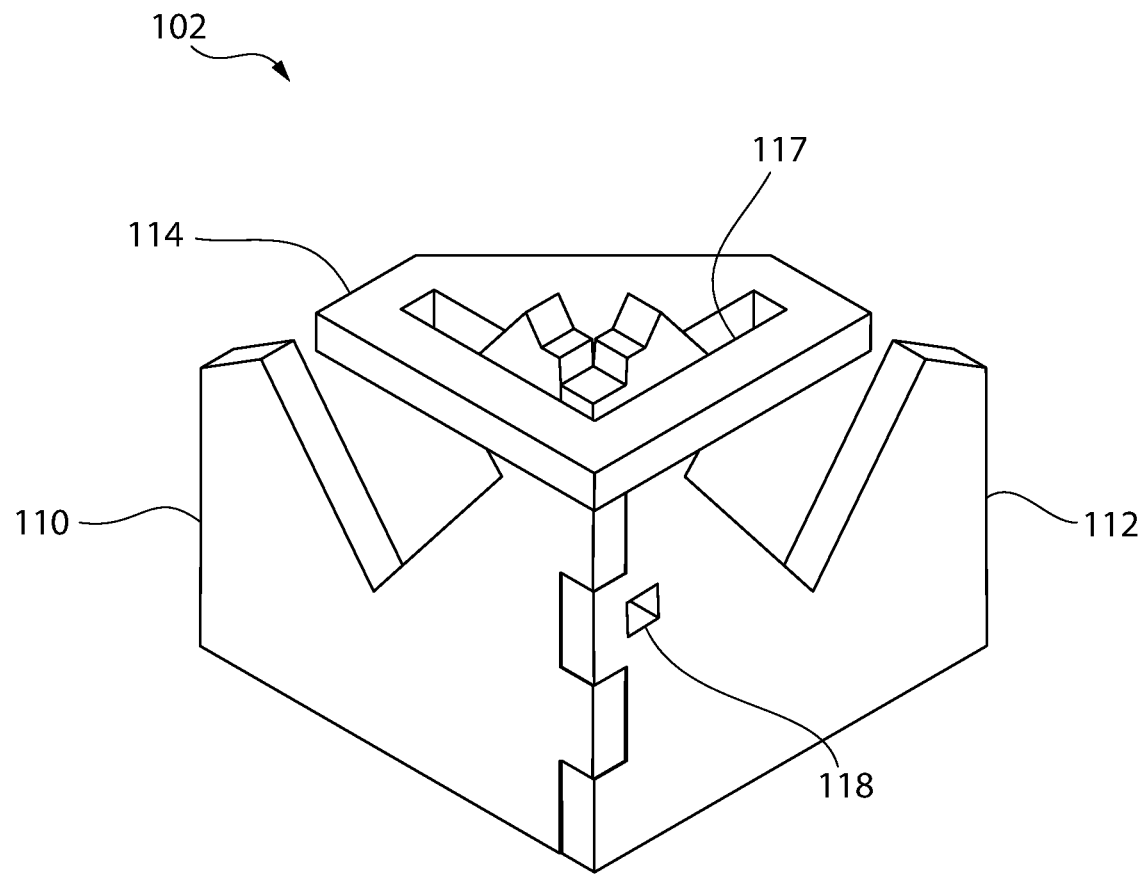
FIG. 6 is a rear view of the stand of the display mount of FIG. 1A.
Figure 7:
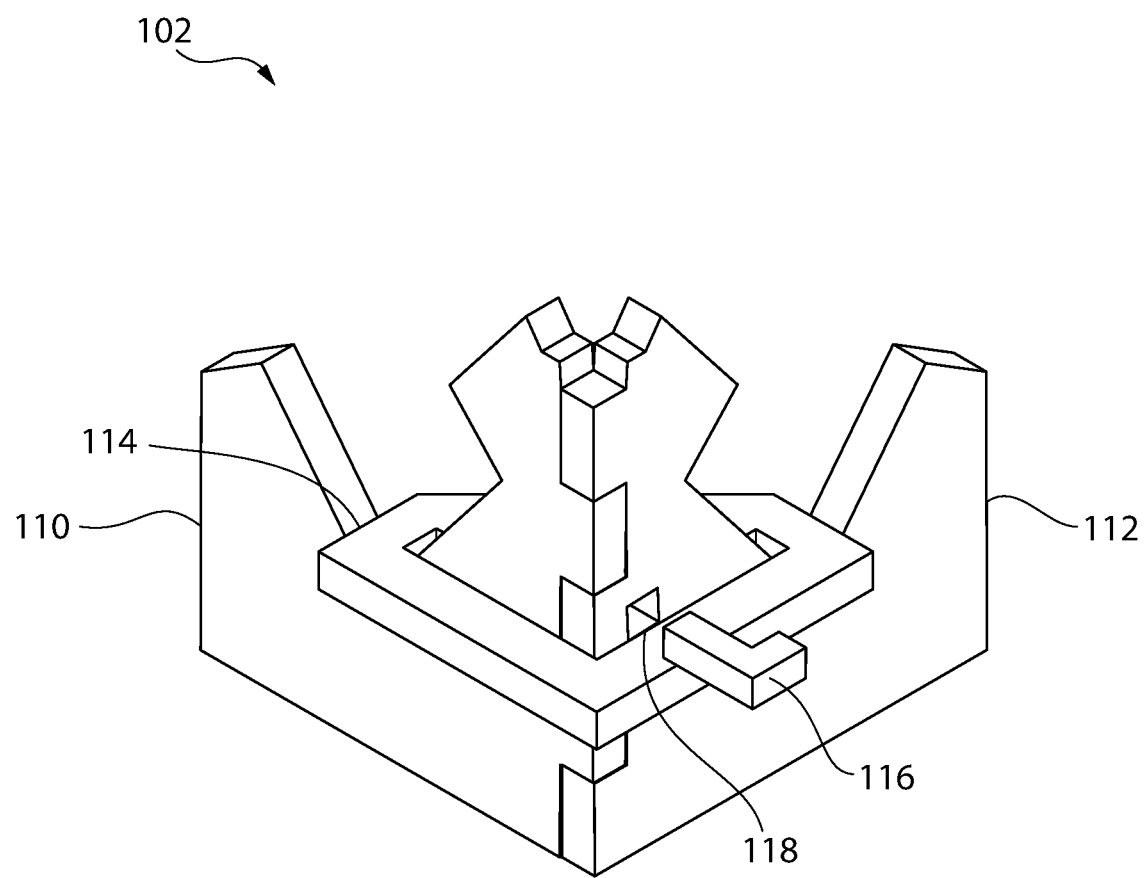
FIG. 7 is a rear view of the stand of the display mount of FIG. 1A.

Referring to FIGS. 2 and 3, stand 102 may include first stand leg 110 and second stand leg 112. First stand leg 110 and second stand leg 112 may include bottom edge 131. First stand leg 110 and second stand leg 112 may be coupled together such that they are interlocked together to form a joint. In one embodiment, first stand leg 110 and second stand leg 112 are interlocked together in a corner joint or box joint configuration. However, other joint configurations may be used to interlock first stand leg 110 and second stand leg 112. For example, oblique joints, dovetail joints, finger joints, dowels, or any other joint configuration capable of interlocking first stand leg 110 and second stand leg 112 may be used. In some embodiments, the joint between first stand leg 110 and second stand leg 112 may be a hinge. In one embodiment, the joint between first stand leg 110 and second stand leg 112 is a living hinge. First stand leg 110 and second stand leg 112 may be interlocked together via tabs 111 disposed on first stand leg 110 and second stand leg 112. For example, first stand leg 110 may include alternating tabs 111 with recesses disposed between tabs 111, and second stand leg 112 may include alternating tabs 111 with recesses disposed between tabs 111 such that the recesses of second stand leg 112 are configured to receive tabs 111 of first stand leg 110, and the recesses of first stand leg 110 are configured to receive tabs 111 of second stand leg 112. First stand leg 110 and second stand leg 112 may include between one and fifteen tabs, between three and twelve tabs, or between five and ten tabs. First stand leg 110 and second stand leg 112 may also include an equal number of recesses to receive tabs 111. In some embodiments, each tab 111 may be spaced apart from an adjacent tab 111 by approximately 1 inch and each tab 111 may have a height of 1 inch. However, tabs 111 may be spaced apart from each other in increments between approximately 0.25 inches and approximately 3 inches, approximately 0.5 inches and approximately 2.5 inches, or approximately 1 inch and 2 inches. Further, tabs 111 may have a height between approximately 0.25 inches and approximately 3 inches, approximately 0.5 inches and approximately 2.5 inches, or approximately 1 inch and 2 inches. First stand leg 110 and second stand leg 112 may be coupled together without any adhesives or screws, thus allowing first stand leg 110 and second stand leg 112 to be easily assembled and disassembled. First stand leg 110 may be coupled to second stand leg 112 such that first stand leg 110 is substantially perpendicular to second stand leg 112. In some embodiments, no tools, glues, or fasteners are needed to assembly stand 102.

Figure 1B:
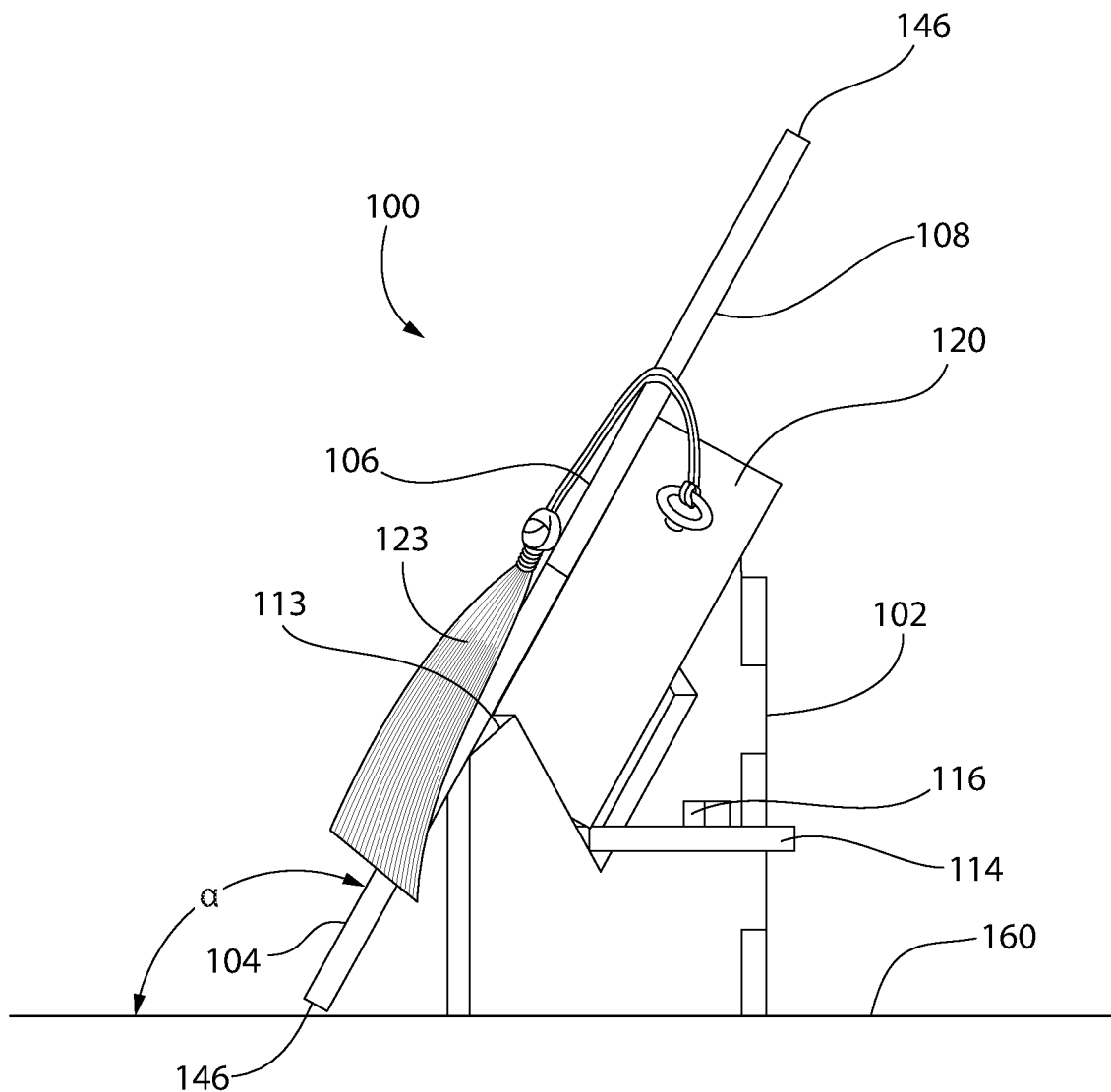
FIG. 1B is a side view of the display mount of FIG. 1A.

First stand leg 110 and second stand leg 112 may include stabilizing wedges 113. Stabilizing wedges 113 may be configured to stabilize display 104 when display 104 is coupled to stand 102. For example, stabilizing wedges 113 may include flat portions 127 that are configured to abut rear surface 108 of display 104 thereby stabilizing display 104. For example, flat portions 127 of stabilizing wedges 113 may abut rear surface 108 such that flat portions 127 are parallel and/or co-planar with rear surface 108. In some embodiments, stabilizing wedges 113 may be configured to abut rear surface 108 of display 104 such that stabilizing wedges 113 are not visible from the front when display mount 100 is in use. For example, as shown in FIGS. 1A-1B, display 104 may be coupled to stand 102 such that stabilizing wedges 113 is blocked form view and a majority of stand 102 is not visible. In some embodiments, when display 104 is coupled to stand 102, stabilizing wedges 113 only abuts rear surface 108 and does not contact front surface 106. First stand leg 110 and second stand leg 112 may further include butterfly tabs 115 configured to engage recess 122 of display 104 to secure display 104 to stand 102. Butterfly tabs 115 may include supporting surface 107 configured to abut display 104 through recess 122 to allow display 104 to securely rest on butterfly tabs 115 of stand 102. In some embodiments, supporting surface 107 may be at an angle to allow display 104 to be displayed at an angle relative to horizontal surface 160. For example, supporting surface 107 may be at angle α relative to horizontal surface 160 to allow display 104 to be angled at angle α relative to horizontal surface 160. Butterfly tabs 115 may be configured to support the weight of display 104, with stabilizing wedges 113 assisting in positioning display 104 at a predetermined angle. In some embodiments, stand 102 only engages with rear surface 108 of display 104 and does not contact front surface 106. For example, stand 102 may not wrap around the edges of display 104 to contact front surface 106.

Stand 102 may further include stabilizer 114. In some embodiments, stabilizer 114 may be referred to as a slide stabilizer, lock, retainer, locking mechanism, or interlocking retainer. Stabilizer 114 may include front edge 129 and slot 117. Slot 117 may be configured to receive the interlocked first stand leg 110 and second stand leg 112. Stabilizer 114 may be configured to secure the interlocking of first stand leg 110 and second stand leg 112 to prevent first stand leg 110 and second stand leg 112 from being disengaged from one another. Stabilizer 114 may slide down butterfly tabs 115, such that butterfly tabs 115 are disposed through slot 117. For example, stabilizer 114 may slide over first stand leg 110 and second stand leg 112 such that first stand leg 110 and second stand leg 112 extend through slot 117. In use, stabilizer 114 may be a on a plane perpendicular to first stand leg 110 and second stand leg 112 and may be disposed between butterfly tabs 115 and bottom edge 131. Stabilizer 114 may rest in notch 133, which may be disposed between flat portions 127 of stabilizing wedges 113 and bottom edge 131. In one embodiment, slot 117 of stabilizer 114 includes first segment 119 and second segment 121, which are at a substantially 90° angle to one another. In another embodiment, first segment 119 and second segment 121 of slot 117 are at an angle greater than 90° or less than 90°. First segment 119 and second segment 121 of slot 117 may be at any angle at which first stand leg 110 and second stand leg 112 are interlocked together. Slot 117 may be configured such that butterfly tabs 115 of first stand leg 110 and second stand leg 112 can be inserted through slot 117, thereby keeping first stand leg 110 and second stand leg 112 interlocked and preventing first stand leg 110 and second stand leg 112 from being disengaged. In some embodiments, slot 117 is sized and shaped to allow stabilizer 114 to tilt relative to stand 102 to further secure the interlocking of first stand leg 110 and second stand leg 112. For example, the larger the size of slot 117, the more stabilizer 114 tilts relative to stand 102, thereby better securing first stand leg 110 and second stand leg 112 together.

Referring to FIGS. 2-3 and 6-7, at least one of first stand leg 110 and second stand leg 112 may include aperture 118. Aperture 118 may be disposed between stabilizer 114 and display 104. Aperture 118 may be configured to receive locking member 116. Locking member 116 may be an "L" shape and may be placed through aperture 118 to further secure stabilizer 114 to the interlocked first stand leg 110 and second stand leg 112. For example, locking member 116 may overlap with stabilizer 114 and may extend into aperture 118 to prevent stabilizer 114 from being removed from stand 102. Locking member 116 may include first segment 142 and second segment 144. First segment 142 may be perpendicular to second segment 144. In one embodiment, second segment 144 is longer than first segment 142. In another embodiment, first segment 142 and second segment 144 are the same size. In one embodiment, aperture 118 is disposed adjacent to a center tab of first stand leg 110. However, aperture 118 may be disposed at any location of on first stand leg 110 and second stand leg 112.

Referring to FIGS. 1A-2 and 8, display mount 100 may further include display 104. Display 104 may be square shaped. In one embodiment, display 104 is shaped and configured to resemble a graduation cap or a mortarboard. For example, front surface 106 may be square shaped to resemble the mortarboard of a graduation cap. However, display 104 may be any other shape such as a diamond, circle, oval, rectangular, or triangular. Front surface 106 of display 104 may be flat and may include an engraved image or text such as "Congratulations", a name and/or logo such as a school, a message, and/or a picture of an individual such as a photo of a graduate. For example, front surface 106 may be engraved with the face and name of an individual who has graduated, along with a message such as "Congratulations." Front surface 106 and rear surface 108 may be co-planar.

Figure 8:
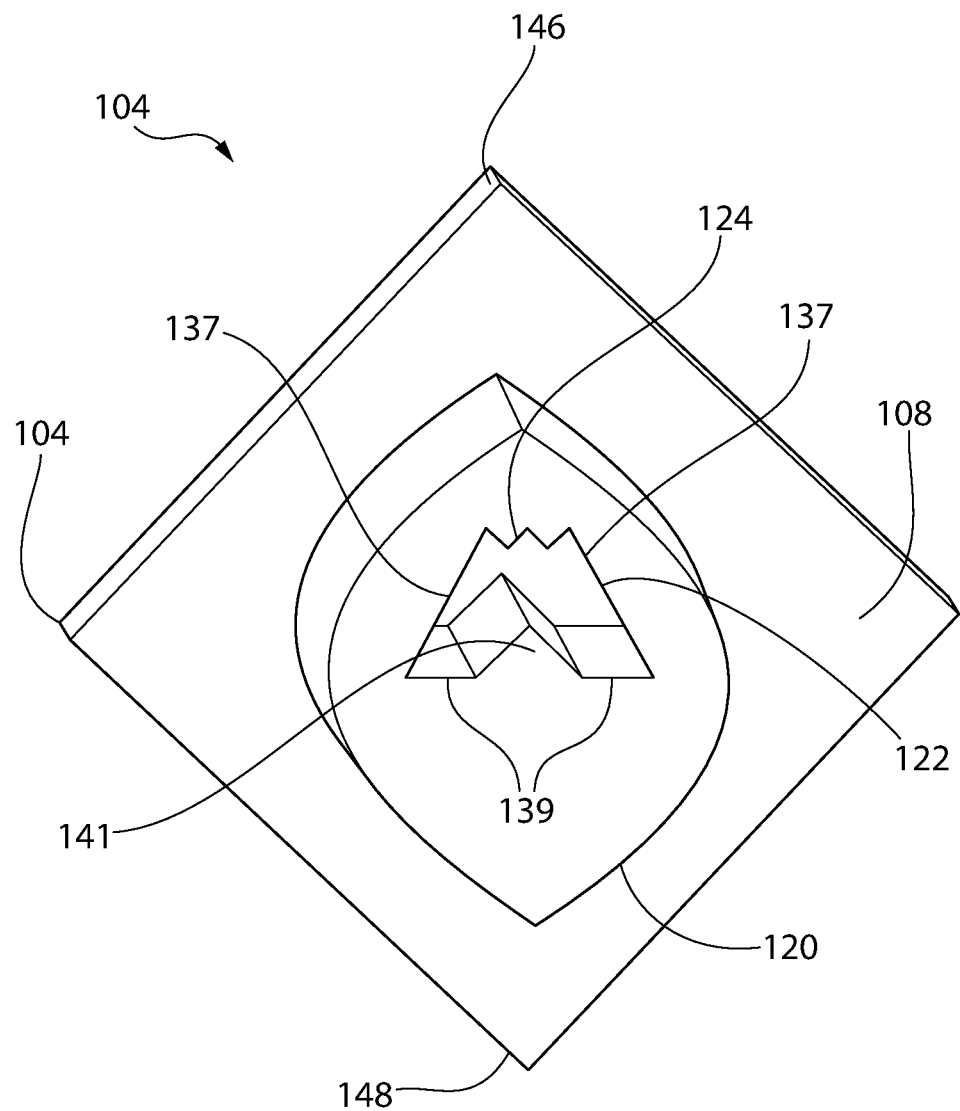
FIG. 8 is a rear view of a display in accordance with a first exemplary embodiment of the present invention.

Referring to FIGS. 2 and 8, rear surface 108 of display 104 may include protrusion 120 which may include recess 122. Protrusion 120 may be coupled to rear surface 108 of display 104. In one embodiment, protrusion 120 and display 104 are an integral piece. In another embodiment, protrusion 120 and display 104 are two separate pieces coupled together. Protrusion 120 may be sized and shaped to resemble the bottom of a graduation cap. For example, protrusion 120 may be almond shaped to resemble the cap portion of a graduation cap. Protrusion 120 may include recess 122, which may extend fully through the thickness of protrusion 120. In some embodiments, recess 122 extends through protrusion 120 and is closed off by rear surface 108 of display 104. Recess 122 may have top edge 124, side walls 137, bottom edge 139, and peak 141. Recess 122 may be configured to receive stand 102. Recess 122 may be have a length and depth configured to securely receive butterfly tabs 115 of stand 102. Butterfly tabs 115 of stand 102 may be inserted into recess 122 to allow display 104 to be propped up to display front surface 106 of display 104. For example, recess 122 may be sized and shaped to securely receive butterfly tabs 115 of stand 102. In use, butterfly tabs 115 of stand 102 may be disposed within recess 122 to allow supporting surface 107 of butterfly tabs 115 to abut rear surface 108 of display 104 through recess 122. In some embodiments, butterfly tabs 115 of stand 102 may be disposed within in recess 122 such that display 104 may be discreetly held up by stand 102. For example, when display 104 is coupled to stand 102, a majority of stand 102 may be concealed by display 104 resulting in the appearance of display 104 being presented without stand 102 being visible. In some embodiments, recess 122 may be shaped to resemble the latter "M" to allow butterfly tab 115 to be disposed within recess 122 to prevent rotation of display 104 when coupled to stand 102. For example, side walls 137 may be disposed on opposite sides of recess 122 and may be angled outward from top edge 124 to bottom edge 139. Side walls 137 may be at predetermined angles to secure and stabilize display 104 when coupled to stand 102. For example, side walls 137 may each be at the same angle as each butterfly tab 115 that they are adjacent to, to secure stand 102 to display 104 and reduce unnecessary movement or rotation of display 104 relative to stand 102. Bottom edge 139 may include peak 141, which may be disposed between side walls 137 to allow butterfly tabs 115 to be secured within recess 122, preventing further movement and rotation of display 104. In use, recess 122 may receive butterfly tabs 115 such that butterfly tabs 115 are adjacent to side walls 137 and peak 141 of bottom edge 139 is disposed between butterfly tab 115 of first stand leg 110 and butterfly tab 115 of second stand leg 112. In some embodiments, no tools, glues, or fasteners are needed to couple display 104 to stand 102.

Recess 122 may also be used to allow display 104 to be mounted on a wall for displaying front surface 106 of display 104. Recess 122 may include top edge 124 to allow display 104 to be placed on a nail mounted to a wall. In some embodiments, top edge 124 is saw toothed to allow for different engagement points when display 104 is coupled to a fastener to hang display 104 on a vertical surface, such as a wall. However, top edge 124 may be flat, include only a single tooth, or include a recess to allow display 104 to be coupled to the fastener.

Display 104 may include a hanging feature such as tassel 123 that hangs over the edge of front surface 106 of display 104. Tassel 123 may hang over front surface 106 of display 104 to resemble a graduation cap after the moving of the tassel during a graduation ceremony. In one embodiment, tassel 123 is coupled to display 104 via tassel holder 153. In one embodiment, tassel holder 153 is an eyehook bolt. However, tassel holder 153 may be an adhesive, screw, tack, Velcro, or any other fastener capable of coupling tassel 123 to display 104. Display 104 may include one or more tassel holders 153. Tassel 123 may be coupled to protrusion 120 of display 104 using tassel holder 153 and may be configured to hang over front surface 106 of display 104. Although FIGS. 1B and 2 show tassel 123 being coupled to protrusion 120, tassel 123 may be coupled to rear surface 108, recess 122, or any other location of display 104. Tassel 123 may be coupled to display 104 to allow tassel 123 to hang over front surface 106 of display 104 without coming into contact with a surface that display 104 and stand 102 are being displayed on. Tassel 123 may be movable relative to display 104 such that tassel 123 may be movable from one side of front surface 106 to another side of front surface 106 to resemble moving of a tassel during a graduation ceremony.

Figure 9:
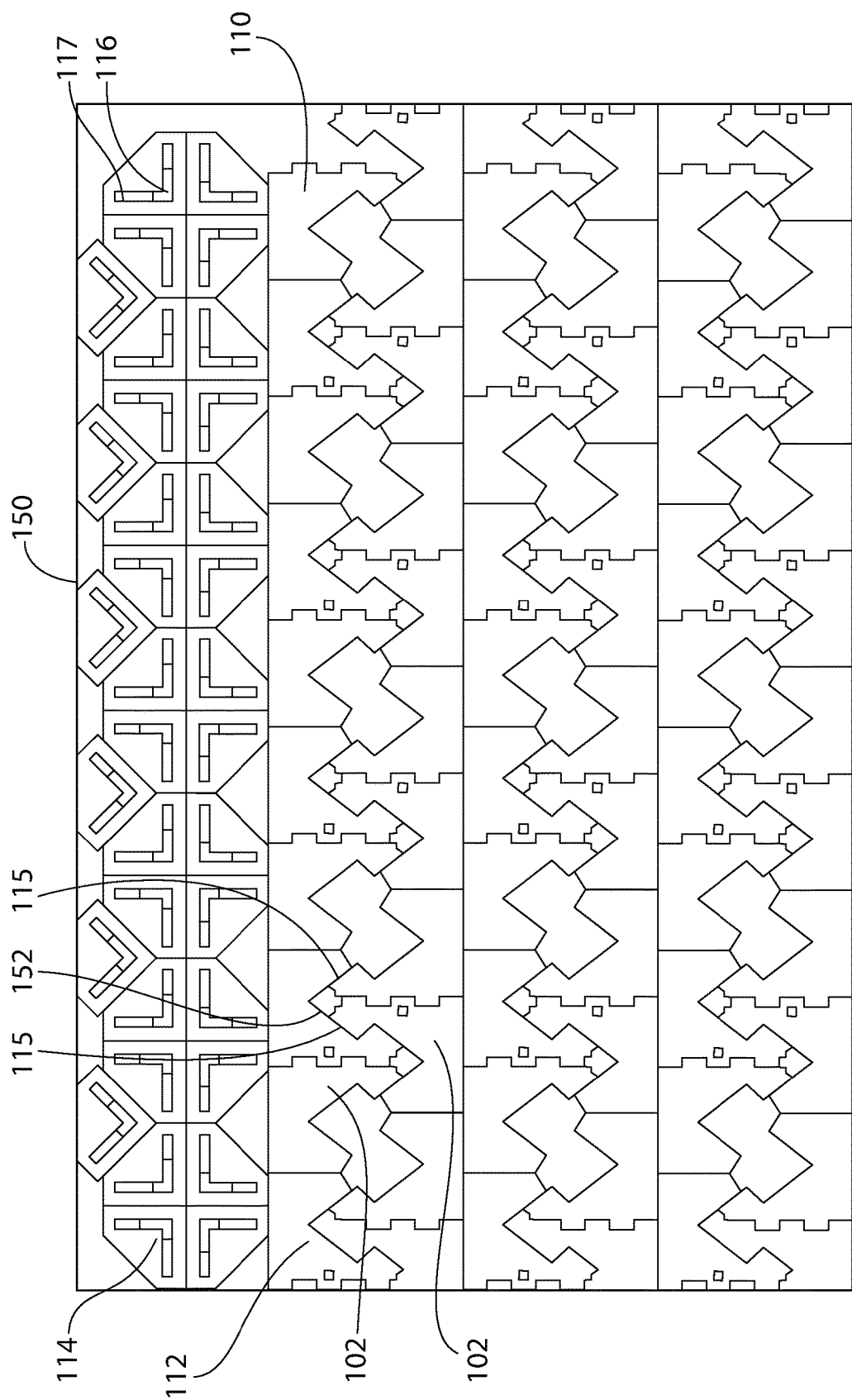
FIG. 9 is an illustration of a single sheet of material of cut lines for the display mount of FIG. 1A.
Figure 10:
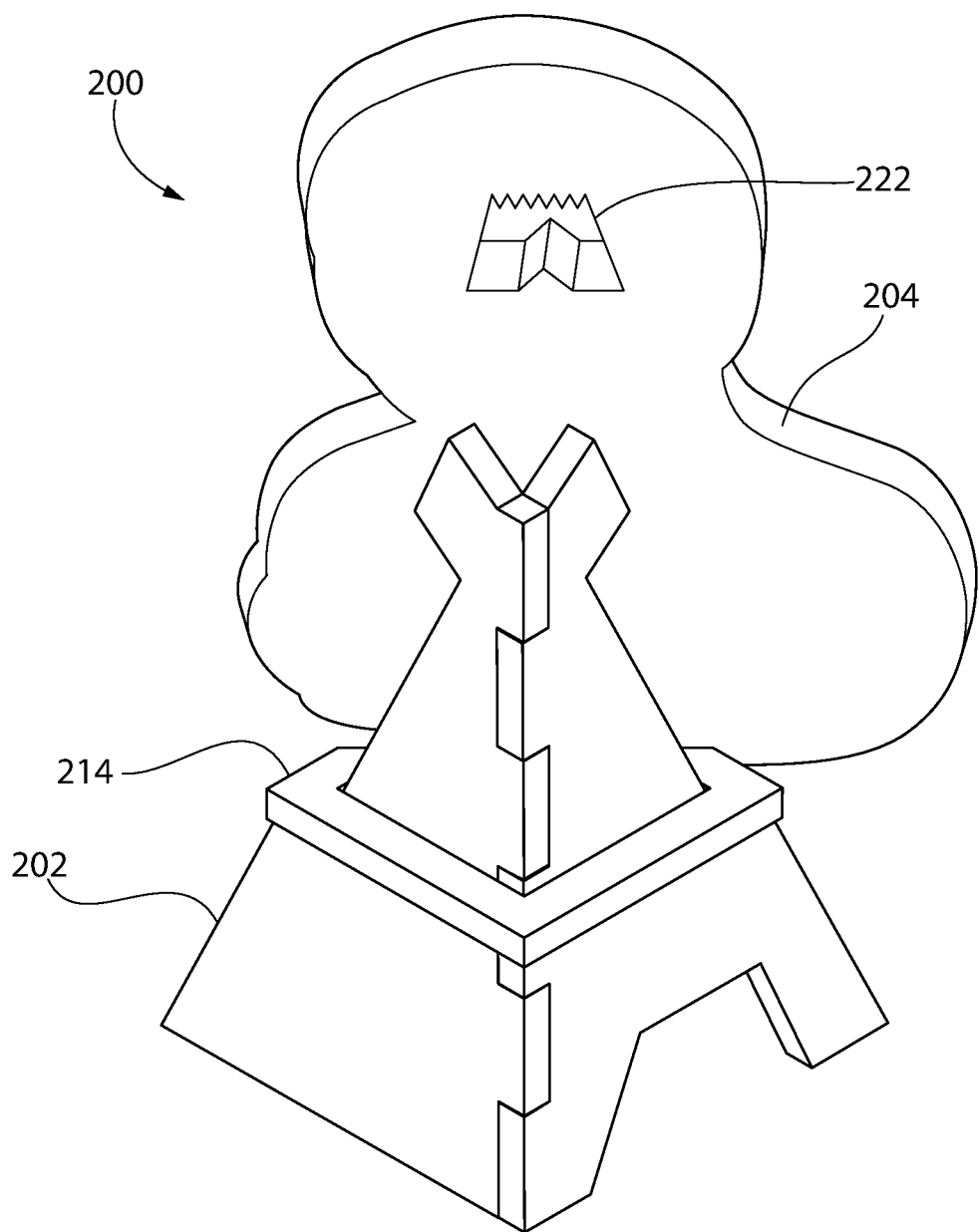
FIG. 10 is a rear perspective view of a display mount in accordance with a second exemplary embodiment of the present invention.
Figure 11:
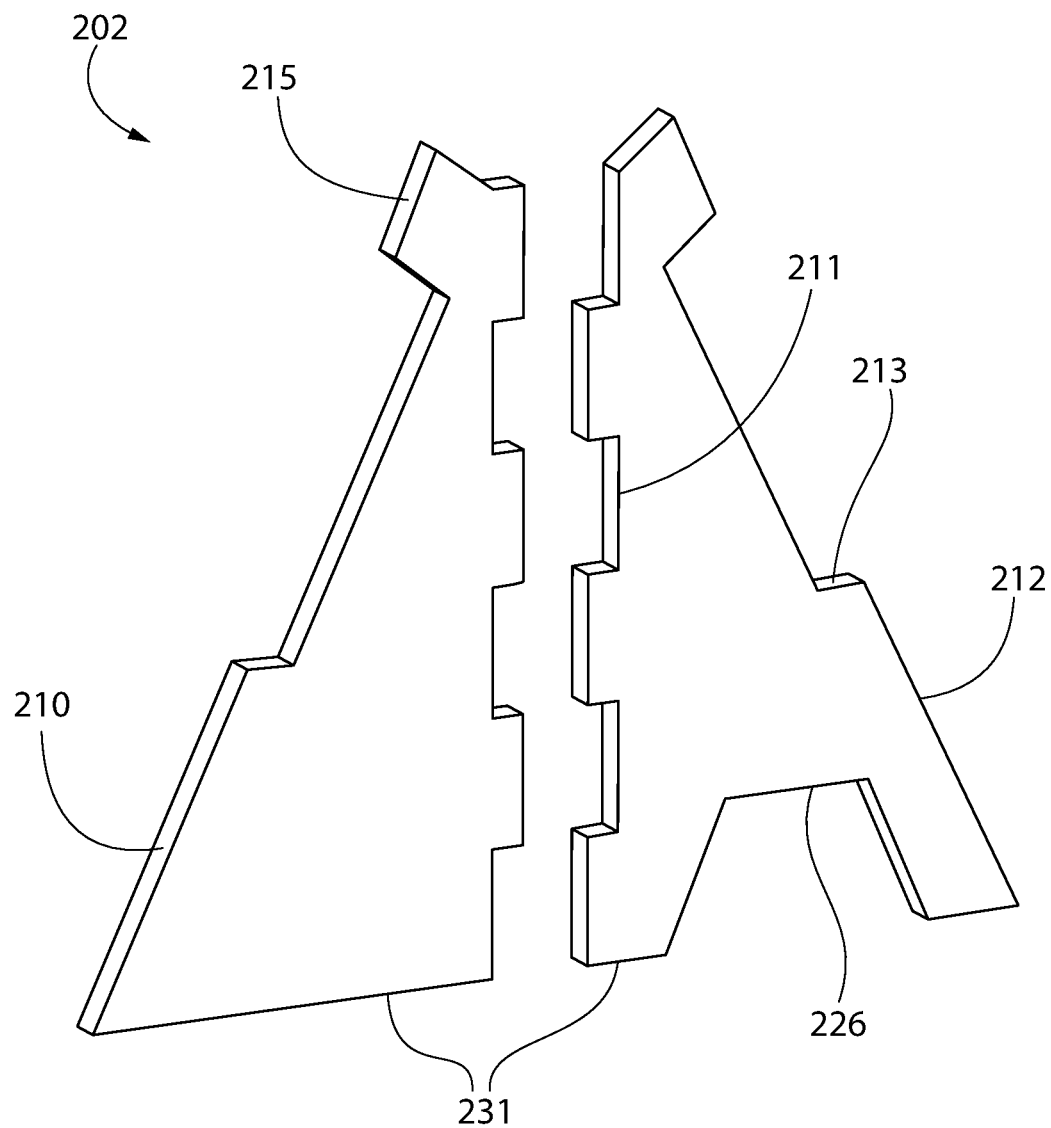
FIG. 11 is a front view of the stand of the display mount of FIG. 9.
Figure 12:
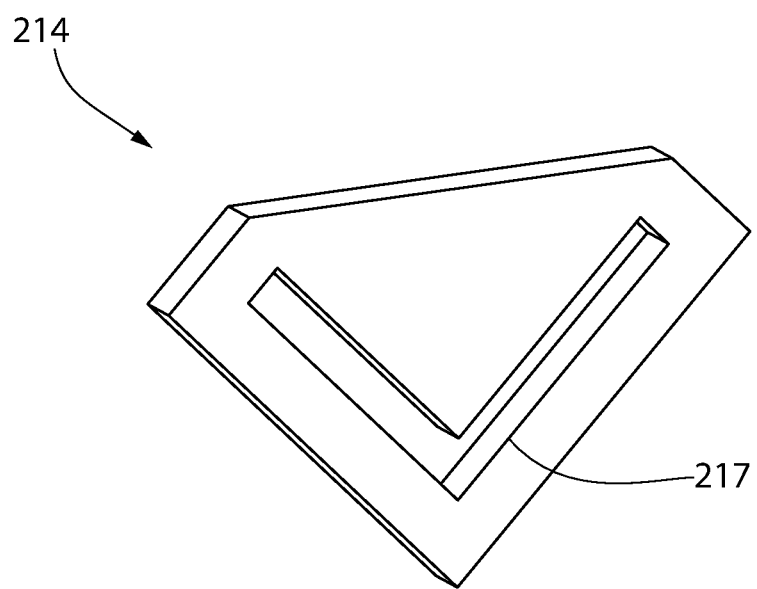
FIG. 12 is a top view of the stabilizer of the display mount of FIG. 9.
Figure 13:
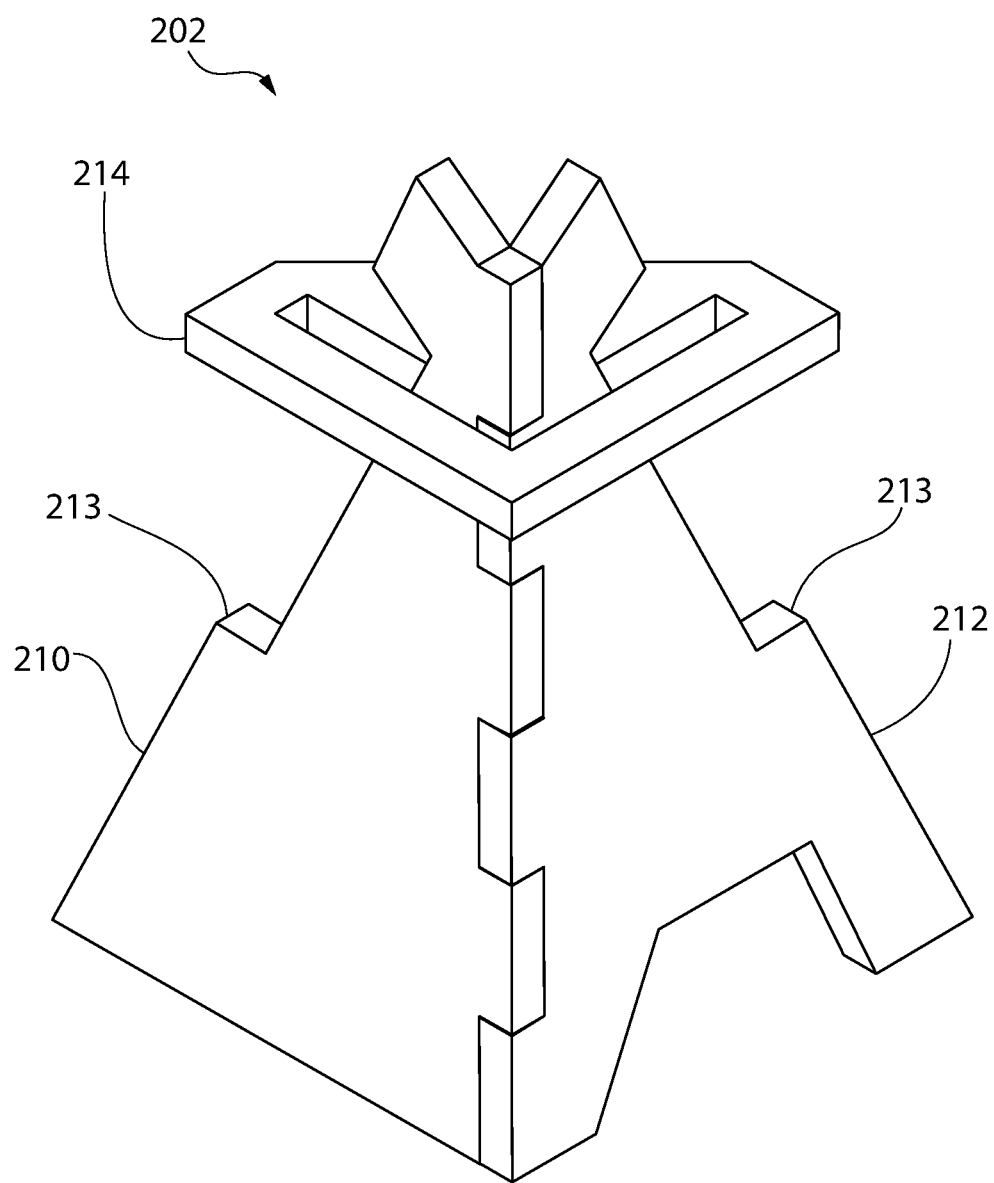
FIG. 13 is a rear view of the stand of the display mount of FIG. 9.

Referring to FIG. 9, first stand leg 110, second stand leg 112, stabilizer 114, and locking member 116 may be designed such they are cut from a piece of material while minimizing wasted material. For example, first stand leg 110 and second stand leg 112 may be alternatingly disposed on single sheet of material 150 and cut from single sheet of material 150 such that there is minimal waste. Single sheet of material 150 may be ¼ inches thick and have dimensions of 30 inches by 37 inches. However, single sheet of material 150 may be any size desired and may be any thickness desired. Single sheet of material_150 may comprised of wood. For example, single sheet of material 150 may be comprised of wood that is ¼ inch thick. However, single sheet of material 150 may be comprised of other materials, such as acrylic. In one embodiment, multiple copies of first stand leg 110, second stand leg 112, stabilizer 114, and locking member 116 are cut from single sheet of material 150 and are sized and shaped to comprise greater than 80% of single sheet of material 150. For example, single sheet of material 150 may include approximately 32 first stand legs 110, 31 second stand legs 112, approximately 34 stabilizers 114, and approximately 34 locking members 116. In some embodiments, multiple copies of first stand leg 110, second stand leg 112, stabilizer 114, and locking member 116 are sized and shaped to comprise between 75% and 100%, 80% and 95%, or 85% and 90% of single sheet of material 150. In some embodiments, multiple copies of first stand leg 110, second stand leg 112, stabilizer 114, and locking member 116 are sized and shaped to comprise approximately 85% of single sheet of material 150. For example, single sheet of material 150 may include alternating rows of stands 102, wherein stands 102 of one row are rotated 180 degrees relative to stand 102 in an adjacent. This allows stands 102 in adjacent rows to interlock together, resembling a puzzle, to minimize waste. In some embodiments, first stand leg 110, second stand leg 112, stabilizer 114, and locking member 116 are cut from single sheet of material 150 using straight line cuts to minimize waste and improve the ease of manufacturing. In one embodiment, stands 102 within single sheet of material 150 may include cutouts 152, which may receive butterfly tabs 115 of stands 102 in adjacent rows. In some embodiments, stands 102 in one row overlap with stands 102 in an adjacent rows by greater 50%. However, stands 102 in one row may overlap with stands 102 in an adjacent row by greater than 40%, greater than 60%, or greater than 75%. Further, locking member 116 may be cut from the piece of material that is removed from stabilizer 114 to create slot 117, thereby further minimizing the waste generated when creating multiple stands 102. In some embodiments, the amount of waste generated from single sheet of material 150 may be less than 10%. However, the amount of waste generated from single sheet of material 150 may be between 0% and 40%, 5% and 35%, 10% and 30%, or 15% and 25%.

Referring to FIGS. 10-14, there is shown a second exemplary embodiment. Display mount 200 may include stand 202 and display 204. Stand 202 is similar to stand 102 shown in FIGS. 1A-2 and as discussed herein, but does not include aperture 118 and locking member 116. Stand 202 may include stabilizer 214, which may be configured to secure the interlocking of first stand leg 210 and second stand leg 212. Stabilizer 214 may be similar to stabilizer 114, but may be a different size than stabilizer 114. Stabilizer 214 may be configured to rest on stabilizing wedges 213 when stand 202 is placed within slot 217 of stabilizer 214. Stand 202 may be sized to holder smaller and/or lighter objects than stand 102. For example, stabilizing wedges 213 of stand 202 may be smaller than stabilizing wedges 113 of stand 102. Further, butterfly tabs 215 of stand 202 may be smaller and less pronounced than butterfly tabs 115 of stand 102. In some embodiments, display 204 is configured to couple to stand 202 via inserting butterfly tabs 215 into recess 222. In one embodiment, display 204 does not abut stabilizing wedges 213 thereby resulting in butterfly tabs 215 supporting the entire weight of display 204. In some embodiments, stand 202 may include notch 226, which may be disposed on stand 202 and may extend from bottom edge 231 towards stabilizing wedge 213. Notch 226 may be sized and shaped to receive butterfly tabs 215.

Figure 14:
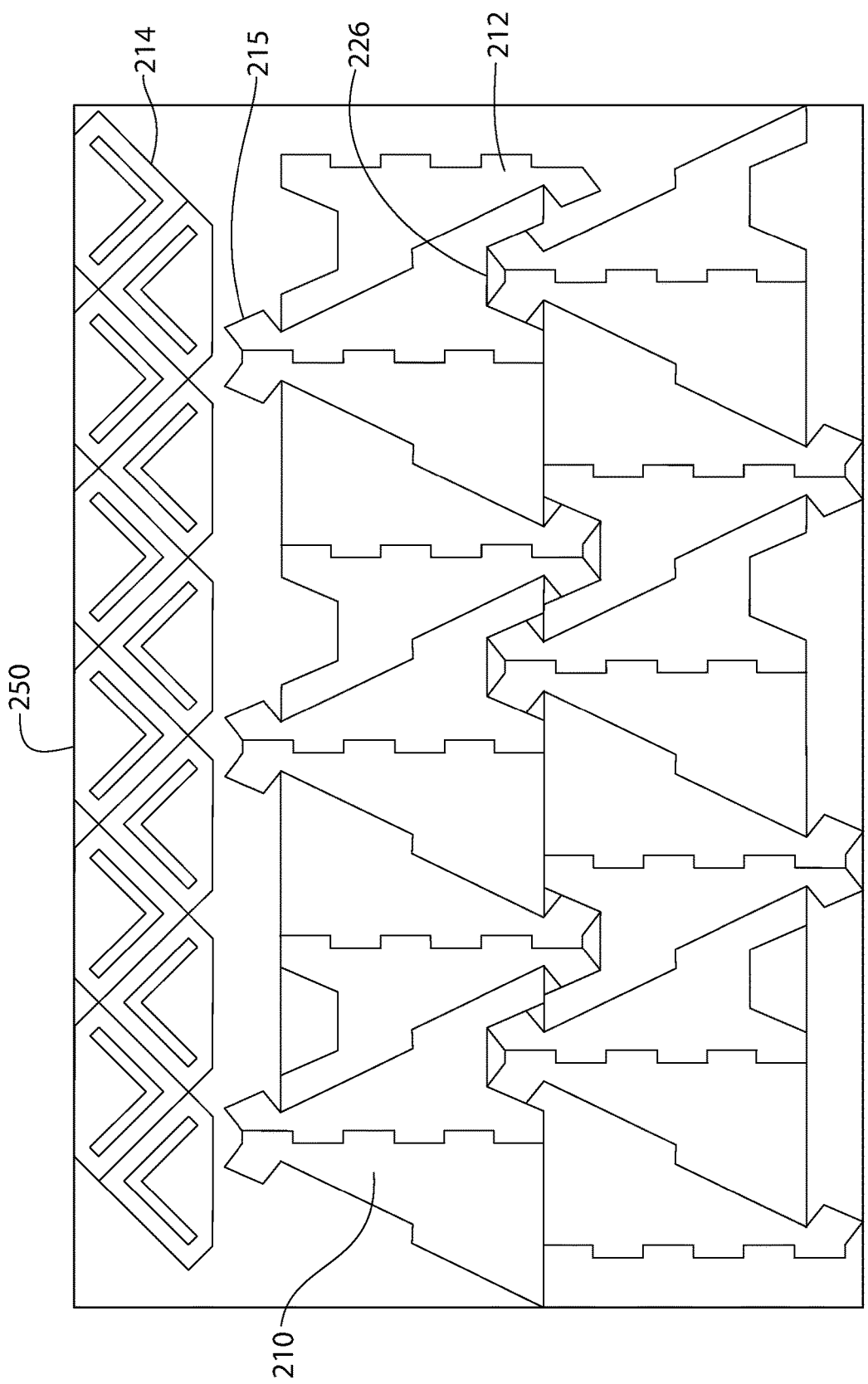
FIG. 14 is an illustration of a cut file of the display mount of FIG. 9.
Figure 15:
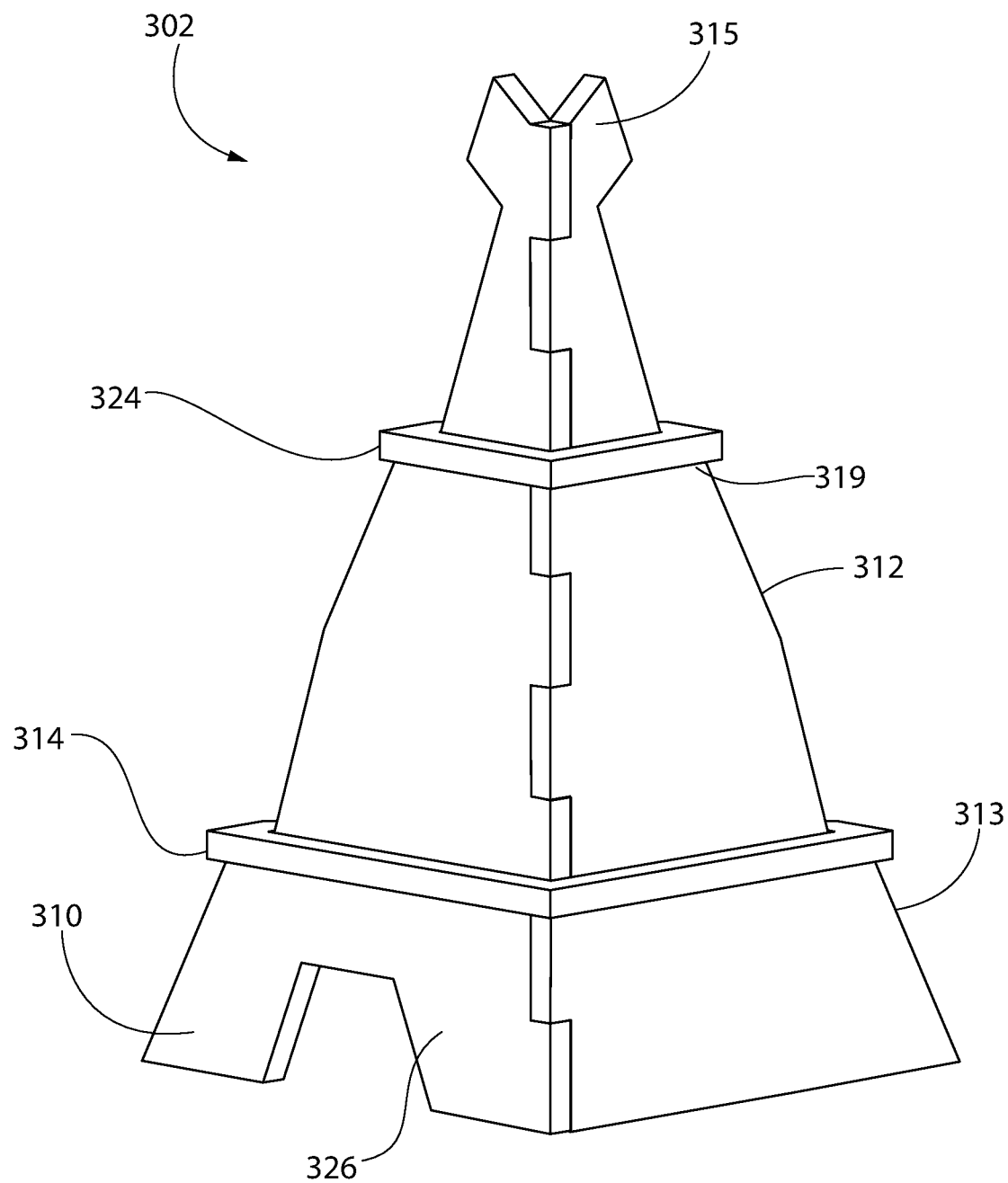
FIG. 15 is a rear perspective view of a display mount in accordance with a third exemplary embodiment of the present invention.
Figure 16:
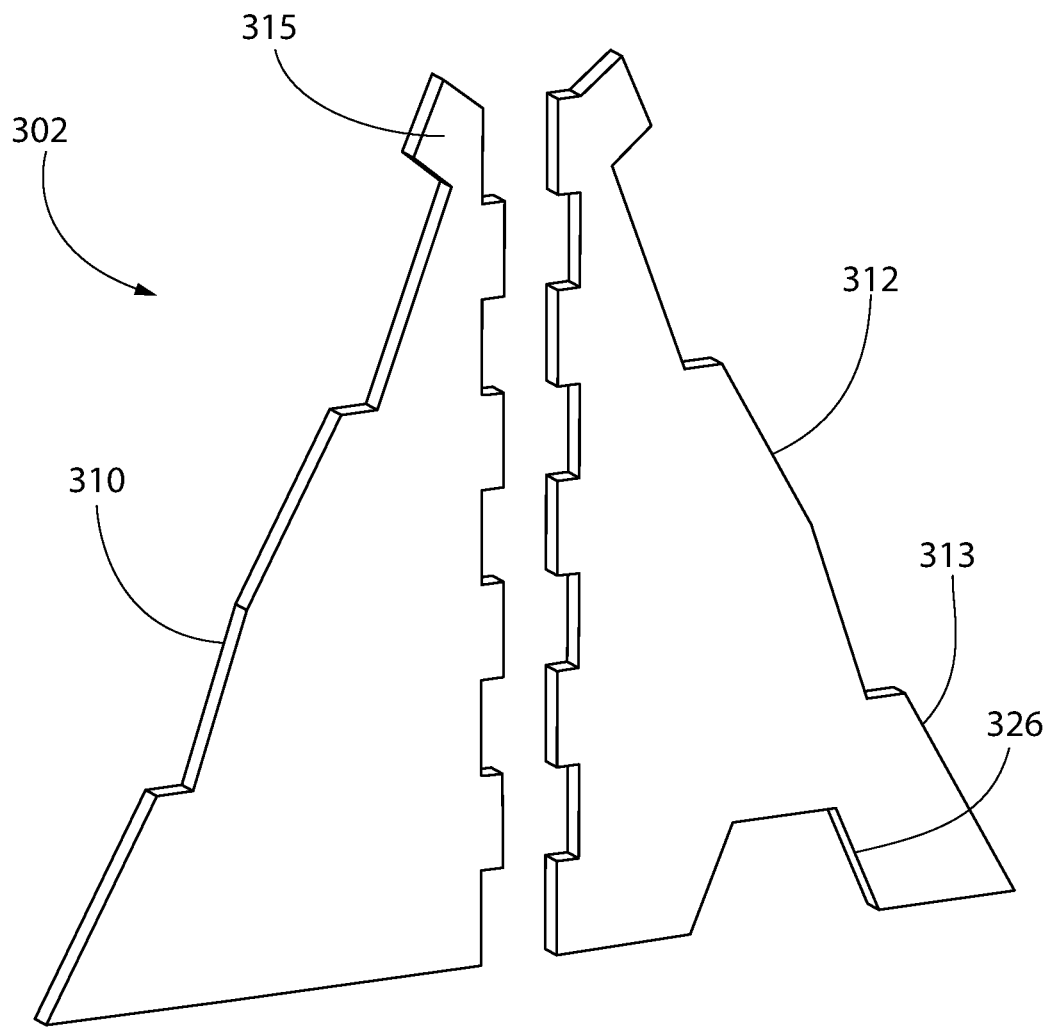
FIG. 16 is a front view of the stand of the display mount of FIG. 14.

Referring to FIG. 14, first stand leg 210, second stand leg 212, and stabilizer 214 may be designed such they are cut from a piece of material while minimizing wasted material, similar to first stand leg 210, second stand leg 212, and stabilizers 214. For example, first stand leg 210 and second stand leg 212 may be alternatingly cut from single sheet of material 250 such that there is minimal waste. Further, multiple stabilizers 114 may be arranged in an alternating manner, thereby further minimizing the waste generated when creating multiple stands 202 from single sheet of material 250. Notch 226 may be formed within stand 202 to minimize the amount of material needed to manufacture stand 202. Further, stand 202 may include notch 226 such that during manufacturing of stand 202, single sheet of material 250 includes multiple stands 202 allowing butterfly tabs 215 of an adjacent stand 202 to be disposed within notch 226, as shown in FIG. 14.

Referring to FIGS. 15-18 and 20, there is shown a third exemplary embodiment. Display mount 300 may include stand 302. Stand 302 is similar to stand 202 shown in FIG. 9 and as discussed herein, but includes additional stabilizer 324, stabilizing wedges 319, and notch 326. Stand 302 may include stabilizers 314, 324, which may be configured to secure the interlocking of first stand leg 310 and second stand leg 312. For example, stand 302 may have a length greater than stands 102, and 202, thus may require additional stabilizer 324 to further stabilize stand 302. Stabilizer 324 may rest on stabilizing wedge 319. Stand 302 may be sized to holder smaller and/or lighter objects than stand 102. For example, stabilizing wedges 313, 319 of stand 302 may be smaller than stabilizing wedges 113 of stand 102. Further, butterfly tabs 315 of stand 302 may be smaller and less pronounced than butterfly tabs 115 of stand 102. In some embodiments, stand 302 includes notch 326. Notch 326 may be formed within stand 302 to minimize the amount of material needed to manufacture stand 302. Further, stand 302 may include notch 326 such that during manufacturing of stand 302 a single sheet of material includes multiple stands 302 allowing butterfly tabs 315 of an adjacent stand 302 to be disposed within notch 326, as shown in FIG. 17. For example notch 326 may be sized and shaped to fit the contour of first stand leg 310 and second stand leg 312. In one embodiment, notch 326 is sized and shaped to fit the contour of butterfly tabs 315.

Figure 17A:
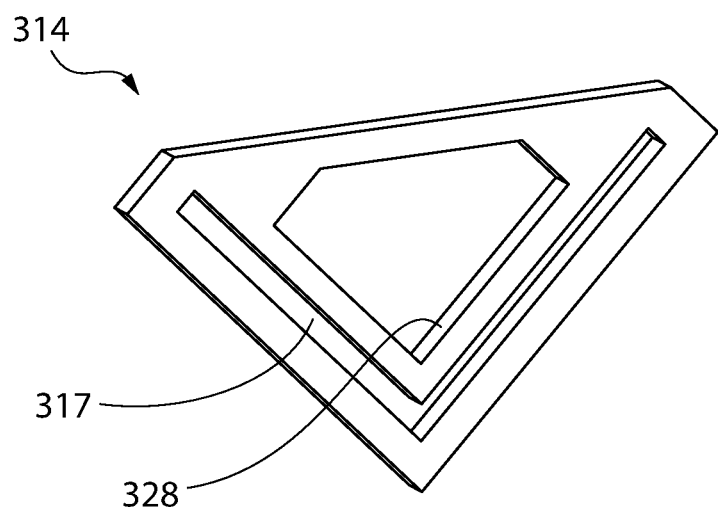
FIG. 17A is a top view of the stabilizer of the display mount of FIG. 14.
Figure 17B:
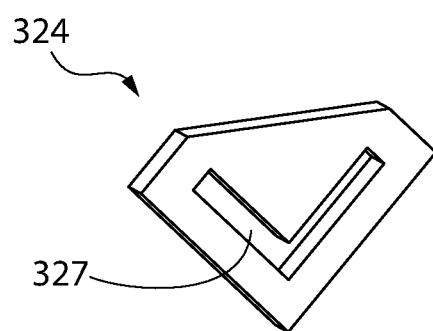
FIG. 17B is a top view of the stabilizer of the display mount of FIG. 14.

Referring to FIGS. 17A and 17B, stand 302 may include stabilizers 314, 324. Stabilizer 314 may include slot 317 and cutout 328. Stabilizers 314, 324 may be similar to stabilizer 114, but stabilizer 324 is sized and shaped to fit within cutout 328. For example, to minimize waste during manufacturing of stand 302, stabilizer 324 may be made from the material forming cutout 328. In some embodiments, stabilizer 314 abuts stabilizing wedges 313 and stabilizer 324 abuts stabilizing wedges 319.

Figure 18:
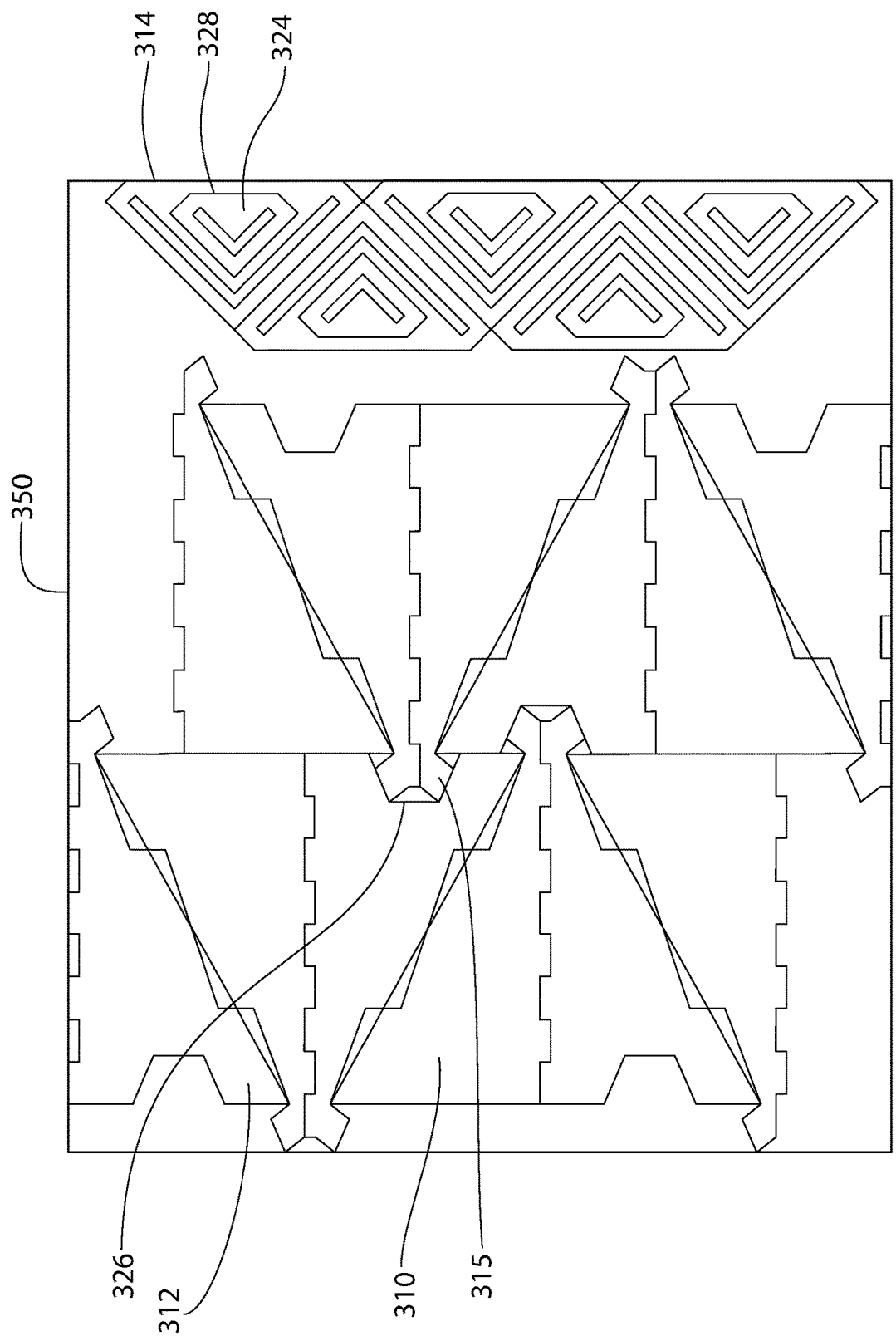
FIG. 18 is an illustration of a cut file of the display mount of FIG. 14.

Referring to FIG. 18, first stand leg 310, second stand leg 312, and stabilizers 314, 324 may be designed such they are cut from a piece of material while minimizing wasted material, similar to first stand leg 210, second stand leg 212, and stabilizers 214. For example, first stand leg 210 and second stand leg 212 may be alternatingly cut from single sheet of material 350 such that there is minimal waste. Second stand leg 312 may include notch 326 which is configured to receive butterfly tabs 315 of first stand leg 310 and second stand leg 312 to minimize the waste generated when creating multiple stands 302 from single sheet of material 350. Further, stabilizer 324 may be disposed within cutout 328 of stabilizer 314 to minimize the amount of material used. In some embodiments, the cuts made to single sheet of material 350 are on the same side of single sheet of material 350. Accordingly, it may be preferred that first stand leg 310 or second stand leg 312 on each end of single sheet of material 150 are matched with a corresponding first stand leg 310 or second stand leg 312 on a different row that was cut from the same side. This allows first stand leg 310 to correspond with second stand leg 312 such that both first stand leg 310 and second stand leg 312 have been cut from the same side of single sheet of material 350.

Figure 19:
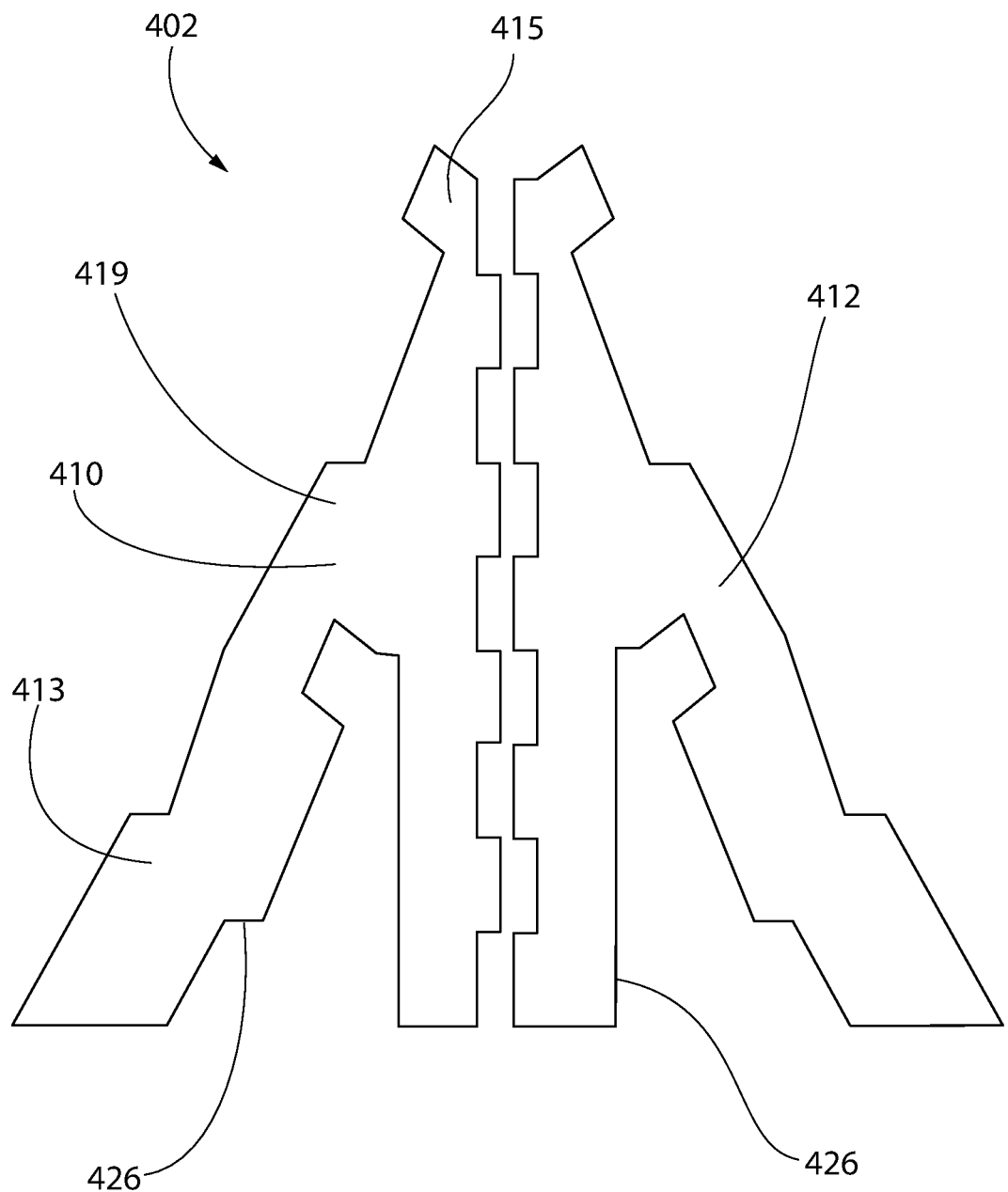
FIG. 19 is a front view of a stand in accordance with a fourth exemplary embodiment of the present invention.
Figure 20A:
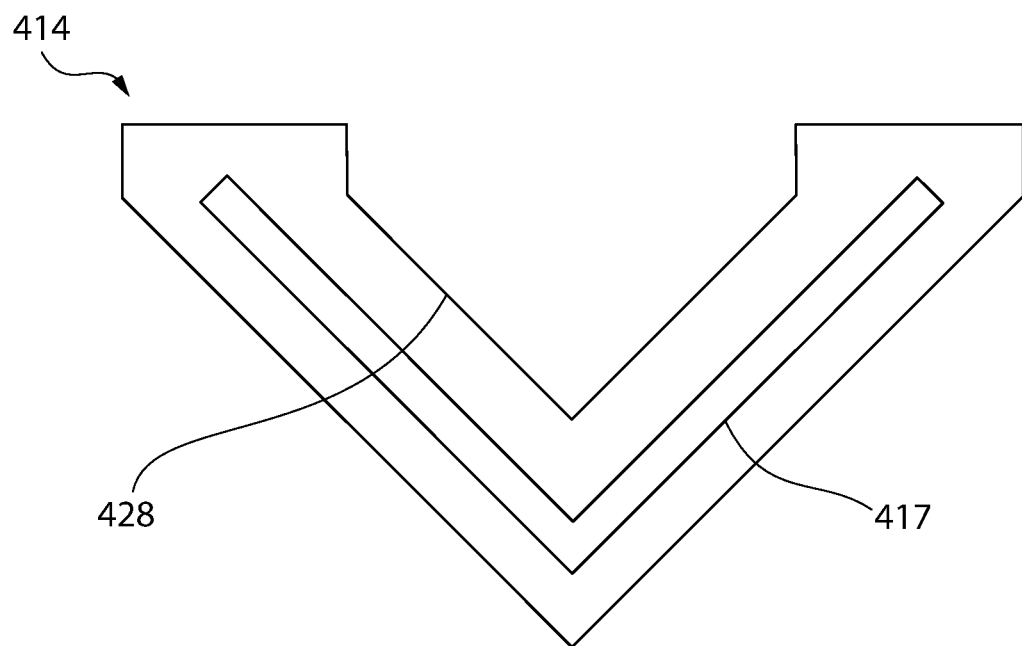
FIG. 20A is a top view of a first stabilizer in accordance with a fourth exemplary embodiment of the present invention.
Figure 20B:
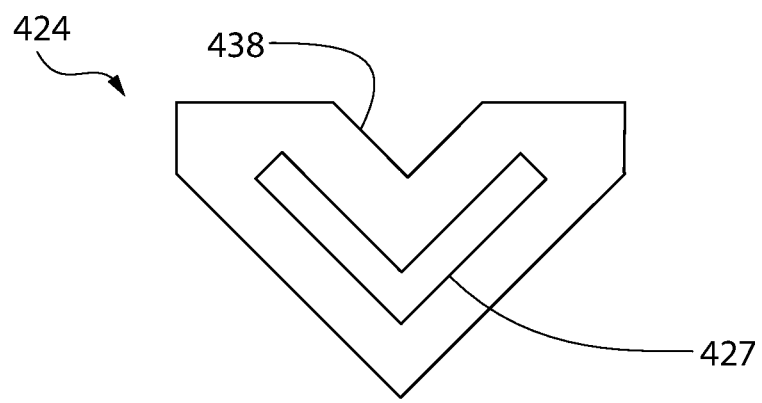
FIG. 20B is a top view of a second stabilizer in accordance with a fourth exemplary embodiment of the present invention.
Figure 21:
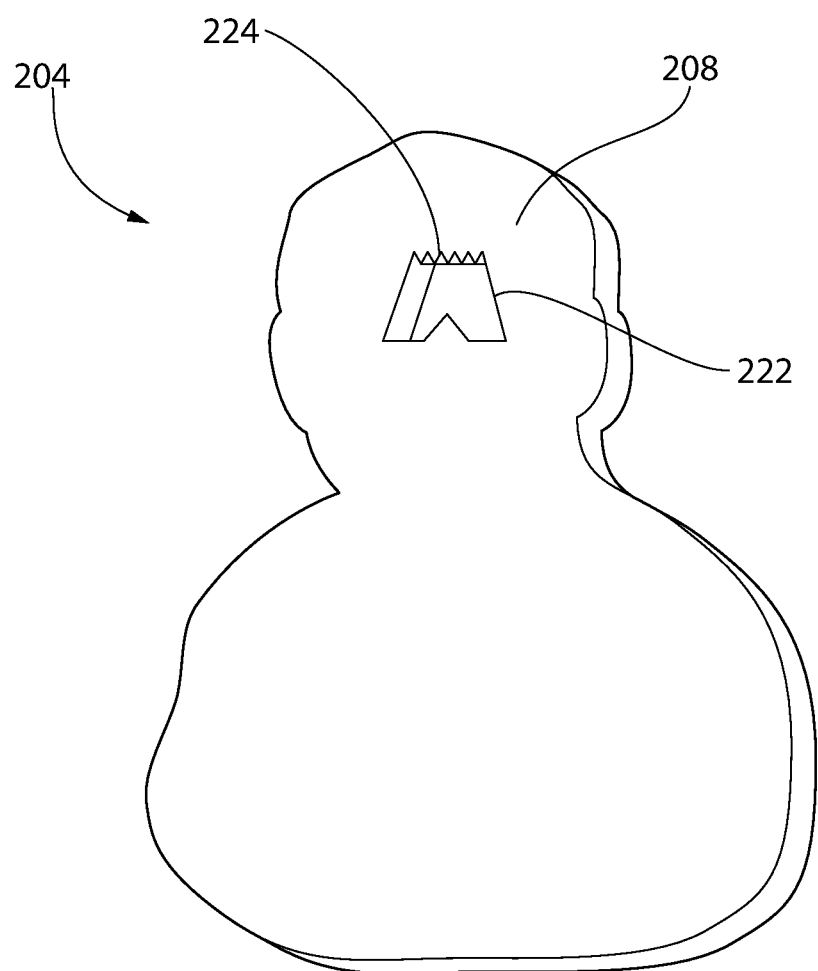
FIG. 21 is a bottom view of a display in accordance with a second exemplary embodiment of the present invention.
Figure 22:
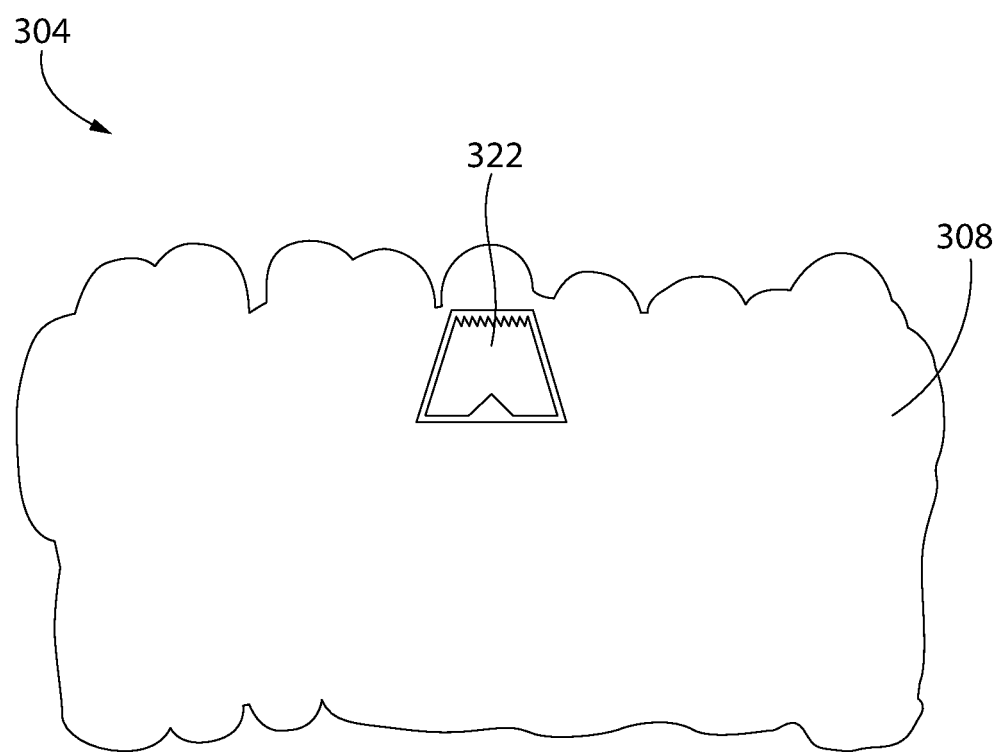
FIG. 22 is a bottom view of a display in accordance with a third exemplary embodiment of the present invention.

Referring to FIGS. 19-20B, there is shown a fourth exemplary embodiment. Stand 402 is similar to stand 302 shown in FIG. 16 and as discussed herein, but includes notches 426 disposed within each of first stand leg 410 and second stand leg 412. Stand 402 may include stabilizers 414, 424, which may be configured to secure the interlocking of first stand leg 410 and second stand leg 412. Notches 426 of stand 402 may be formed within each of first stand leg 410 and second stand leg 412 to minimize the amount of material needed to manufacture stand 402. For example, notches 426 may be sized and shaped to receive butterfly tabs 415 and stabilizing wedges 419 of stand 402. Notch 426 may be sized and shaped such that during manufacturing of stand 402 a single sheet of material includes multiple stands 402 allows butterfly tabs 415 and stabilizing wedges 419 of an adjacent stand 402 to be disposed within notches 426. For example, notches 426 may be sized and shaped to fit the majority of the contour of first stand leg 310 and second stand leg 312.

Referring to FIGS. 20A and 20B, stand 402 may include stabilizers 414, 424. Stabilizer 414 may include slot 417 and cutout 428. Stabilizers 414, 424 may be similar to stabilizers 314, 324, respectively, but stabilizers 414 may include notch 438 and may be sized and shaped to be received by cutout 428. For example, to minimize waste during manufacturing of stand 402, stabilizer 424 may be made from the material forming cutout 428. In some embodiments, stabilizer 414 abuts stabilizing wedges 413 and stabilizer 424 abuts stabilizing wedges 419.

Referring to FIGS. 1-2, 10, and 21-23C, stands 102, 202, 302, 402 may be used with any of displays 104, 204, 304. Displays 204, 304 may be similar to display 104, but may vary in shape and display 104 may include protrusion 120. For example, display 104 may be the shape of a graduation hat, display 204 may be the shape of a person's head, and display 304 may be the shape of a group of people. In one embodiment, displays 204, 304 includes a protrusion. In another embodiment, displays 204, 304 do not include a protrusion. Each one of displays 204, 304 may include recess 222, 322 disposed on rear surface 208, 308, respectively. Recess 222, 322 may be the same or substantially the same as recess 122. Recess 122, 222, 322, may be configured to receive butterfly tabs 115, 215, 315 to couple any of displays 104, 204, 304 to any of stands 102, 202, 302, 402 or may be configured to receive a fastener for mounting displays 104, 204, 304 to a vertical surface, such as a wall.

Figure 23A:
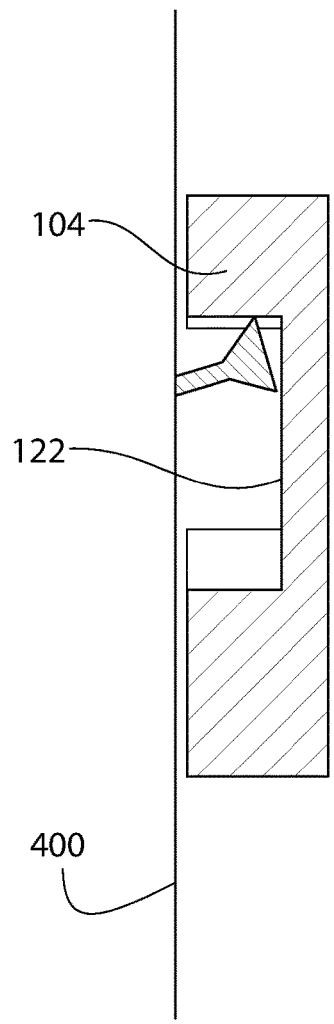
FIGS. 23A-23C are illustrations of mounting a display to a vertical surface in accordance with an exemplary embodiment of the present invention.
Figure 23B:
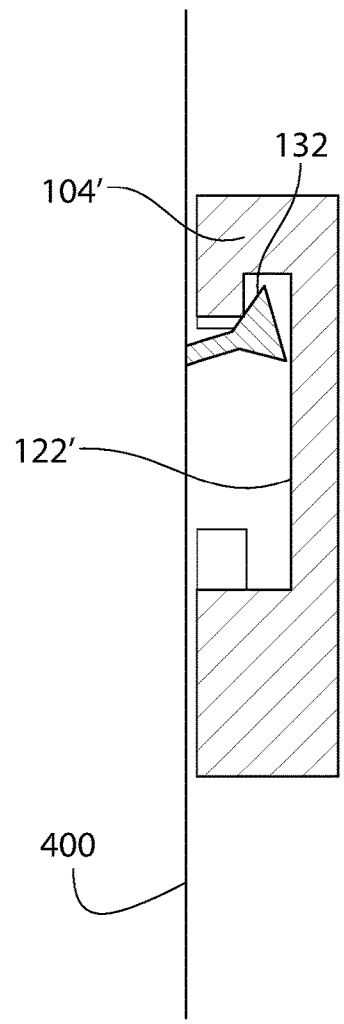
Figure 23C:
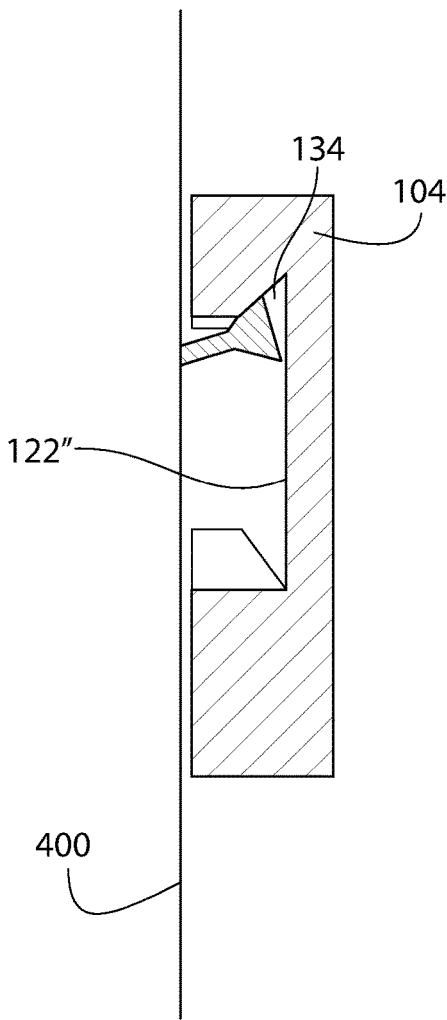
Figure 24C:
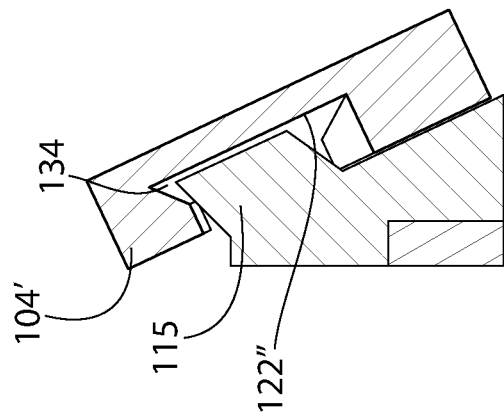
FIGS. 24A-24C are illustrations of mounting a display to a stand in accordance with an exemplary embodiment of the present invention.
Figure 24B:
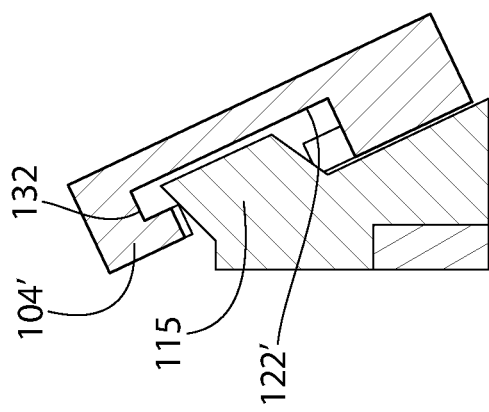
Figure 24A:
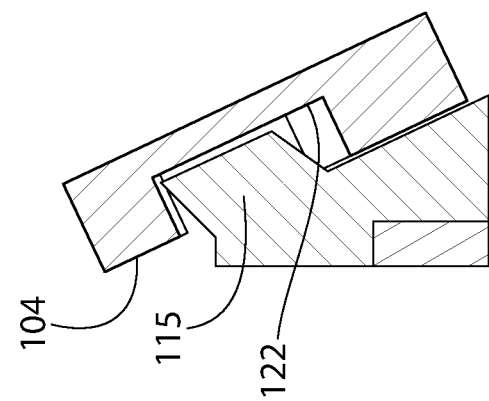

Referring to FIGS. 23A-24C, display 104 may be mounted via a nail coupled to surface 400 or coupled to stand 202 via butterfly tabs 115. Referring to FIGS. 23A and 24A, display 104 may not include a notch and the nail or butterfly tabs 115 may abut recess 122. Referring to FIGS. 23B and 24B, display 104' may include notch 132 disposed within recess 122'. Notch 132 may be rectangular in shape and configured to receive the nail or butterfly tabs 115 to allow a better hold when mounting display 104' to surface 400 or stand 102, respectively. Referring to FIGS. 23C and 24C, display 104" may include notch 134 disposed within recess 122". Notch 134 may be triangular in shape and configured to receive nail or butterfly tabs 115 to allow a better hold when mounting display 104" to surface 400 or stand 102, respectively. Display 104 may include notches of other shapes, such circular, hexagonal, pentagonal, or any other shape desired.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. The words "front", "back", "lower" and "upper" designate directions in the drawings to which reference is made. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

What is claimed is:

1. A display mount comprising:
a stand having a first stand leg and a second stand leg, the first stand leg interlocked with the second stand leg forming a joint;
a stabilizer releasably coupled to the stand and having a slot, the first stand leg and the second stand leg each extending through the slot fixing the joint in place;
a display releasably coupled to the stand and having a front surface and a rear surface, the rear surface having a recess; and
a locking member,
wherein a top end of the stand extends into the recess to hold the display in place,
wherein at least one of the first stand leg and the second stand leg includes an aperture located between the stabilizer and the display, and
wherein the locking member overlaps with the stabilizer and extends into the aperture to prevent the stabilizer from being removed from the stand.

2. The display mount of claim 1, wherein the slot of the stabilizer is sized and shaped to receive the locking member when the stabilizer is removed from the stand.

3. The display mount of claim 1, wherein the first stand leg and the second stand leg each include a butterfly tab having a supporting surface and the recess of the display receives each butterfly tab such that the butterfly tab is disposed within the recess and each supporting surface abuts the rear surface of the display.

4. The display mount of claim 3, wherein one of the first stand leg or the second stand leg includes a notch extending from a bottom edge of the first stand leg or the second stand leg, the notch being sized and shaped to match a contour of the butterfly tab of the first stand leg and the second stand leg when the stand is disassembled.

5. The display mount of claim 1, wherein the first stand leg and the second stand leg each include a stabilizing wedge having a flat portion co-planar with and abutting the rear surface of the display when the display is coupled to the stand.

6. The display mount of claim 1, wherein the stabilizer is perpendicular to each of the first stand leg and the second stand leg when the first stand leg and the second stand leg are disposed within the slot of the stabilizer.

7. The display mount of claim 1, wherein the stabilizer is a first stabilizer and the display mount further comprises:
a second stabilizer sized and shaped to fit within a cutout of the first stabilizer when the first stabilizer is removed from the stand, the second stabilizer having a slot, wherein the first stand leg and the second stand leg each extend through the slot of the second stabilizer.

8. The display mount of claim 1, wherein the recess of the display includes a top edge and two side walls, the two side walls disposed on opposite sides of the recess and angled outward away from the top edge.

9. The display mount of claim 1, wherein the slot of the stabilizer includes a first segment and second segment, the first segment being at substantially a 90° angle relative to the second segment.

10. The display mount of claim 1, wherein the display includes a protrusion disposed on the rear surface of the display, the recess extending through the protrusion and closed off by the rear surface of the display.

11. The display mount of claim 1, wherein the first stand leg includes a plurality of tabs and the second stand leg includes a plurality of recesses, wherein the plurality of tabs of the first stand leg interlock with the plurality of recesses of the second stand leg to couple the first stand leg to the second stand leg to form the joint.

12. The display mount of claim 1, wherein the display includes a mortarboard shape, a protrusion extending from the rear surface of the display, an engraved picture on the front surface of the display and a tassel coupled to the protrusion of the display via a tassel holder to allow the tassel to overhang on the front surface of the display.

13. A decorative graduation cap display comprising:
a stand having a bottom edge, a first stand leg and a second stand leg, the first stand leg and the second stand leg each including a plurality of tabs, the plurality of tabs of the first stand leg interlocking with the plurality of tabs of the second stand leg at a substantially 90 degree angle forming a joint, wherein the first stand leg and the second stand leg each include a butterfly tab and a stabilizing wedge;
a stabilizer coupled to the stand and including a slot, the slot having a first segment and a second segment at a substantially 90 degree angle to the first segment, the first stand leg and the second stand leg each extending through the slot to fix the joint in place, wherein the stabilizer is disposed between the butterfly tabs and the bottom edge and perpendicular to each of the first stand leg and the second stand leg;
a locking member having a first segment and a second segment;
an aperture disposed on one of the first stand leg or the second stand leg the locking member extending through the aperture;
a display releasably coupled to the stand and having a front surface with an engraved image and/or message and a rear surface, the rear surface having an almond shaped protrusion to resemble a cap of a graduation cap, the almond shaped protrusion having a recess sized and shaped to receive each of the butterfly tabs of the first stand leg and second stand leg, the front surface being square shaped to resemble a mortarboard of a graduation cap; and
a tassel coupled to the rear surface of the display and moveable relative to the display to overhang on either side of the front surface of the display.

14. A method comprising:
cutting from a single sheet of material a first stand leg, a second stand leg, a stabilizer, and a locking member, wherein multiple copies of the first stand leg, the second stand leg, the stabilizer, and the locking member are sized and shaped to comprise greater than 80% of the single sheet of material;
removing the first stand leg, the second stand leg, the stabilizer, and the locking member from the single sheet of material;
coupling the first stand leg to the second stand leg to form a stand having a joint such that the first stand leg is at a substantially 90 degree angle to the second stand leg when the stand is placed on a horizontal surface;
coupling the stabilizer to the first stand leg and the second stand leg by sliding the stabilizer over the first stand leg and the second stand leg such that the first stand leg and the second stand leg extend through a slot disposed within the stabilizer to fix the joint in place;
inserting the locking member through an aperture extending through one of the first stand leg and the second stand leg to prevent the stabilizer from being removed from the stand; and
removeably coupling a display to both of the first stand leg and the second stand leg, the display having a recess, wherein the first stand leg and the second stand leg are inserted into the recess.

15. The method of claim 14, further comprising:
removing the display from the stand; and
mounting the display on a vertical surface via a fastener, wherein the recess receives the fastener.

* * * * *